US008525779B2

(12) United States Patent
Oh

(10) Patent No.: US 8,525,779 B2
(45) Date of Patent: Sep. 3, 2013

(54) CHARACTER INPUT DEVICE

(76) Inventor: Eui Jin Oh, Daejeon (KR)

( * ) Notice: Subject to any disclaimer, the term of this patent is extended or adjusted under 35 U.S.C. 154(b) by 369 days.

(21) Appl. No.: 12/745,054

(22) PCT Filed: Dec. 5, 2008

(86) PCT No.: PCT/KR2008/007230
§ 371 (c)(1),
(2), (4) Date: May 27, 2010

(87) PCT Pub. No.: WO2009/072847
PCT Pub. Date: Jun. 11, 2009

(65) Prior Publication Data
US 2010/0309116 A1 Dec. 9, 2010

(30) Foreign Application Priority Data

Dec. 5, 2007 (KR) .......... 10-2007-0125400
Mar. 31, 2008 (KR) .......... 10-2008-0029651
Nov. 12, 2008 (KR) .......... 10-2008-0112292

(51) Int. Cl.
G09G 5/00 (2006.01)
(52) U.S. Cl.
USPC .............. 345/156; 345/161; 345/173; 463/36
(58) Field of Classification Search
USPC .......... 345/156–58, 161, 169, 173, 156–158; 178/18.01–18.04; 463/36–39
See application file for complete search history.

(56) References Cited

U.S. PATENT DOCUMENTS

| 5,446,480 | A | 8/1995 | Yoshida |
| 6,567,072 | B2 | 5/2003 | Watanabe |
| 6,963,332 | B1 * | 11/2005 | Watanabe ...................... 345/161 |
| 7,773,073 | B2 * | 8/2010 | Nagata et al. ................. 345/169 |
| 7,825,909 | B2 * | 11/2010 | Niida ............................. 345/173 |
| 7,884,802 | B2 * | 2/2011 | Yoshioka ...................... 345/169 |
| 7,936,335 | B2 * | 5/2011 | Uotani .......................... 345/160 |
| 2002/0145587 | A1 * | 10/2002 | Watanabe ...................... 345/156 |
| 2003/0020694 | A1 | 1/2003 | Kim et al. |
| 2006/0028453 | A1 * | 2/2006 | Kawabe ........................ 345/173 |

FOREIGN PATENT DOCUMENTS

| EP | 1383034 | 1/2004 |
| JP | 07-041634 | 7/1995 |
| JP | 2000-267786 | 9/2000 |
| JP | 2000-330688 | 11/2000 |
| JP | 2002-312118 | 10/2002 |
| KR | 1020010107477 | 12/2001 |
| KR | 2004-0068514 | 7/2004 |
| KR | 2005-0078190 | 8/2005 |
| KR | 1020050079126 | 8/2005 |
| WO | 2004072837 | 8/2004 |
| WO | 2005064804 | 7/2005 |
| WO | 2007/055532 | 5/2007 |

* cited by examiner

Primary Examiner — Kimnhung Nguyen
(74) Attorney, Agent, or Firm — Lexyoume IP Meister, PLLC

(57) ABSTRACT

The present invention relates to a character input device. The character input device includes a base. An input unit is provided on the base and independently performs first directional input in which the input unit moves from a reference location to one of first direction indication locations arranged radially around the reference location and spaced apart from one another, and second directional input in which one of second direction indication locations arranged radially on the input unit and spaced apart from one another is selected. A first detection unit detects movement of the input unit. A second detection unit detects second directional input. A control unit extracts a first character assigned to a first direction indication location at which movement of the input unit is detected, or a second character assigned to a second direction indication location at which second directional input is detected.

16 Claims, 32 Drawing Sheets

Fig. 15

| $M1_1$ | $M1_2$ | $M1_3$ | $M1_4$ | $M1_5$ | $M1_6$ | $M1_7$ | $M1_8$ |
|---|---|---|---|---|---|---|---|
| ㄱ | ㄴ | ㄷ | ㄹ | ㅁ | ㅂ | ㅅ | ㅇ |
| B | C | D | F | G | H | J | K |
| か | さ | た | な | は | ま | ら | わ |
| 1 | 2 | 3 | 4 | 5 | 6 | 7 | 8 |
| $M2_1$ | $M2_2$ | $M2_3$ | $M2_4$ | $M2_5$ | $M2_6$ | $M2_7$ | $M2_8$ |
| ㅈ | ㅊ | ㅋ | ㅌ | ㅍ | ㅎ | ㅐ | ㅔ |
| L | M | N | P | Q | R | S | T |
|  |  |  |  |  |  |  |  |
| $P1_1$ | $P1_2$ | $P1_3$ | $P1_4$ | $P1_5$ | $P1_6$ | $P1_7$ | $P1_8$ |
| ㅏ | ㅑ | ㅓ | ㅕ | ㅗ | ㅛ | ㅜ | ㅠ |
| A | E | I | O | U | W | X | Y |
| あ | え | い | お | う | や | ゆ | よ |
| 9 | 0 | * | # | . | . | - | + |
|  |  |  |  |  |  |  |  |
| $P2_1$ | $P2_2$ | $P2_3$ | $P2_4$ | $P2_5$ | $P2_6$ | $P2_7$ | $P2_8$ |
| ㅡ | ㅣ | ㅐ | ㅔ | Enter | Space | Back Space | ESC |
| V | Z | CH | ING | Enter | Space | Back Space | ESC |
| " | ○ |  |  | Enter | Space | Back Space | ESC |
|  |  |  |  |  |  |  |  |
| $C1_1$ |  | $C2_1$ |  |  |  |  |  |
| MODE SWITCH |  | MOUSE |  |  |  |  |  |

(a)

(b)

"A B C"

"B A C"

"B C A"

(a)   (b)

(a)   (b)   (c)   (d)

(a)   (b)

(a)　　　　　　　　　　　　　(b)

(a)

(b)

(a)  (b)

(a)

(b)

(a)                                  (b)

CHARACTER INPUT DEVICE

TECHNICAL FIELD

The present invention relates, in general, to a character input device, and, more particularly, a character input device that is capable of simultaneously or sequentially performing first directional input and second directional input using one input unit, thus enabling one or more phonemes to be rapidly and accurately input through one action while maximizing the number of characters that can be input through one action in a minimum of input space.

BACKGROUND ART

With the development of software and semiconductor technology and data processing technology, information devices are gradually becoming smaller, so that the importance of inputting characters using such information devices is gradually increasing.

Meanwhile, the input of various characters or instructions to such information devices exhibits many problems.

For example, input devices, such as keyboards, used in Personal Computers (PCs) or notebook computers, cause difficulty when realizing small-sized information devices because there is a limitation on the reduction in the size thereof, and touch screen schemes used in Personal Data Assistants (PDAs) and keypad schemes used in mobile phones are inconvenient because the speed of input is slow and the incidence of erroneous input is high.

In order to input letters, numbers or symbols to the above-described information devices, such as PCs, notebook computers, PDAs or mobile phones, at a higher speed, it is necessary to perform a so-called one action-one phoneme input, in which one phoneme (character) is input through one input action.

When such one action-one phoneme input is applied to the Korean alphabet, it is necessary to provide buttons or input keys for inputting 24 or more characters on an information device.

When the target language of input is English, Japanese or some other language, a larger number of buttons or input keys is required than in the case of the Korean alphabet.

However, conventional input devices used in various types of information devices adopt a scheme of assigning characters to respective input keys and inputting the characters by striking or pressing the input keys using the fingers.

Due thereto, it is difficult to arrange 24 or more finger-sized input keys on a personal mobile information terminal having a small area for the arrangement of input keys, such as a mobile phone. This is the reason why it has been difficult to realize small-sized keyboards to date.

In particular, in the case of mobile phones, since 24 or more Korean alphabet letters are input using only 12 buttons, it is inevitable that a plurality of letters is arranged on each button.

Accordingly, a repeated input phenomenon, in which an input action is repeated twice or three times to input one letter (phoneme), occurs frequently, so that input time increases in proportion to the number of repetitions and erroneous input occurs frequently.

Further, since such an input method itself is greatly complicated, there is a problem in that it takes a long time to become accustomed to the input method.

In order to overcome the above problem, in the case of the input of the Korean alphabet, a character input method of inputting characters through combination, known as Cheon-jiin, has been proposed.

This method is advantageous in that, since a desired character is generated by combining fundamental letters with each other, the number of input buttons to which characters are assigned can be reduced, but is disadvantageous in that, since an input button must be repeatedly pressed until desired letters are combined, input time increases in proportion to the number of repetitions.

Furthermore, technologies, including a roll-up keyboard, which can be rolled up and then carried, and a virtual laser keyboard, which is configured to project an image of a keyboard onto a surface, detect the locations of the fingers when actions similar to keyboard input actions are performed on the image using the fingers, and perform input, have been proposed.

However, such types of input devices have problems in that they are inconvenient because they must always be carried, and in that the types of input devices are not suitable for application to personal portable information terminals requiring input in the state in which the personal portable information terminals are held in the hands while moving because input can be performed only in the state in which those types of input devices are placed on supporting surfaces.

DISCLOSURE OF INVENTION

Technical Problem

Accordingly, the present invention has been made keeping in mind the above problems occurring in the prior art, and an object of the present invention is to provide a character input device, in which a new input unit for performing first directional input and second directional input independently or in combination is provided, thus enabling the fast and accurate input of each desired character through one input action while minimizing the space required to input characters or the like.

Another object of the present invention is to provide a character input device, in which various input methods are added to or combined with first directional input and second directional input, thus enabling one or more phonemes to be input through one input action.

Technical Solution

In order to accomplish the above objects, the present invention provides a character input device, comprising a base; an input unit provided on the base, wherein the input unit is configured to independently perform first directional input in which the input unit is moved from a reference location to any one of a plurality of first direction indication locations arranged radially around the reference location and spaced apart from one another within a predetermined input radius, and second directional input in which any one of a plurality of second direction indication locations arranged radially on the input unit itself and spaced apart from one another is selected; a first detection unit for detecting movement of the input unit; a second detection unit for detecting the second directional input; and a control unit for extracting a first character assigned to a first direction indication location at which the movement of the input unit is detected, or a second character assigned to a second direction indication location at which the second directional input is detected, from a memory unit, and executing the extracted character.

The input unit may be provided to enable a central input to be perform.

The central input is performed using a central input key provided at a center of the input unit and a third detection unit for detecting selection of the central input.

The central input may be performed using both a structure in which the entire input unit is moved vertically relative to the base, and a third detection unit for detecting the vertical movement of the input unit.

The central input is provided to be performed in two or more steps, that is, in multiple steps.

The second directional input is performed in such a way that the input unit is tilted downwards to a direction of any one of the second direction indication locations.

The second directional input may be performed by selecting any one of press parts provided on the input unit to correspond to the respective second direction indication locations.

The first directional input may be performed in such a way that the input unit slides from the reference location to any one of the first direction indication locations.

The first directional input may be performed in such a way that the input unit is tilted downwards and moved to a direction of any one of the first direction indication locations.

The second directional input may be provided to be performed in two or more steps, that is, in multiple steps, using one of a degree of tilting of the input unit, intensity of pressing of the press parts, and difference in a distance of pressing.

Here, the first directional input may be provided to be performed in two or more steps, that is, in multiple steps, depending on a difference in a distance of movement of the input unit or intensity of pressure causing movement.

Further, the first directional input may provided to be performed in two or more steps, that is, in multiple steps, depending on a difference in a distance of movement of the input unit, a degree of tilting movement of the input unit, or intensity of pressure causing movement.

New data different from characters originally assigned to the respective direction indication locations is input through combined central input in which the central input is performed simultaneously with one of first directional input and the second directional input.

On the other hand, vowels may be assigned to one of the first direction indication locations and the second direction indication locations.

One or more of the first directional input and the second directional input are performed in such a way that the input unit is moved in a circumferential direction around the reference location within the input radius.

The character input device according to the present invention further includes a guide unit provided on the base and configured to guide movement of the input unit.

The guide unit comprises a plurality of linear guides for guiding movement of the input unit in a radial direction from the reference location to the respective first direction indication locations.

A disk-shaped groove corresponding to the input radius is formed on the base, thus guiding circumferential movement of the input unit while limiting a distance of radial movement of the input unit.

Further, the character input device according to the present invention further includes click means for providing an impression of clicking when one or more of the first directional input, the second directional input and the central input are performed.

It is preferred that the guide unit is made of an elastic material.

Further, the character input device according to the present invention further includes a plurality of elastic elements disposed between the input unit and the base to have different moduli of elasticity and provided in a number corresponding to a number of steps of the multi-step input, the elastic elements being sequentially arranged so that the moduli of elasticity thereof gradually increase in a direction from the input unit toward the respective first direction indication locations, thus enabling the multi-step first directional input to be performed in such a way that respective steps thereof are discriminated from each other depending on a difference between the moduli of elasticity.

The first direction indication locations and the second direction indication locations is provided to indicate one of 4 to 12 input directions.

Here, a number of first direction indication locations may be different from a number of second direction indication locations.

Further, the character input device according to the present invention further includes a support unit for supporting the input unit so that the input unit is spaced apart from the base by a predetermined height, wherein the first directional input is performed in such a way as to hold the input unit using two or more fingers and tilt the input unit downwards to a direction of the respective first direction indication locations, and the second directional input is performed in such a way as to tilt the input unit downwards to a direction of the respective second direction indication locations with respect to the support unit.

The input unit may be provided to be extended from and retracted to the base.

The character input device according to the present invention further includes a plurality of side press parts provided along an outer circumference of a side surface of the input unit.

It is preferred that the input unit is made of an elastic material.

It is preferred that a non-slip member is further provided on a top surface of the input unit.

Further, the character input device according to the present invention further includes a reference location detection unit provided at the reference location and configured to detect that the input unit is placed at the reference location.

Switching between input modes or various function commands may be executed by the central input.

One or more of mode switching keys required for switching between input modes and function keys required for inputting of function commands such as Enter, Escape or cursor, the mode switching keys and the function keys may be provided on one side of the base.

Further, the character input device according to the present invention further includes a display unit on which an input command extracted by the control unit is displayed.

Here, the display unit may be provided to be detachably mounted on the base.

The display unit comprises a character plate display unit on which input content based on an input action of the user is displayed or characters assigned in a selected input mode are displayed.

The input unit is provided to be rotatable on the base in left and right directions around the reference location.

Further, the input unit may be provided on the base in two or more numbers.

Here, one of the two input units may be assigned vowels.

Touch detection units is provided on one or more of the central input key and upper portions or press parts of each input unit, corresponding to the second direction indication locations, and configured to detect approach or contact of a finger, thus enabling touch input to be performed together with the respective second directional inputs and the central input.

Here, a central input key detection unit is further provided on the central input key and configured to detect contact of the finger, thus enabling the control unit to ignore results of detection by the touch detection units and to prevent the touch input from being performed when the contact of the finger is detected by the central input key detection unit for a predetermined period of time or longer.

A central touch detection unit is further provided at a center of the input unit and configured to detect touch of a finger, and the control unit discriminates a case where a central touch detection signal generated by a touch of a finger on the central touch detection unit and a detection signal generated by the second detection unit attributable to performance of the second directional input are simultaneously received from a case where only a detection signal generated by the second detection unit is received, and then inputs different characters in the two cases.

Button-shaped protrusions are formed on a top of the input unit to correspond to the respective second direction indication locations.

Further, the character input device according to the present invention further includes a transmission/reception unit provided to be connected to an external device using one or more of a wired method and a wireless method and configured to transmit or receive data to or from the external device.

It is preferred that the input unit has a return function of automatically returning to the reference location after the first directional input or the second directional input has been performed.

One of the first directional input and the second directional input is provided to have four direction indication locations and to be performed in two steps, and vowels are assigned to the four respective direction indication locations.

Further, one of the base and the input unit comprises a first character display unit on which first characters assigned to the respective first direction indication locations are displayed to correspond to the first direction indication locations and a second character display unit on which second characters assigned to the respective second direction indication locations are displayed to correspond to the second direction indication locations.

Here, the first character display unit and the second character display unit are configured such that, when two or more characters are assigned together to each location, characters to be input are changed and displayed according to an input mode.

It is preferred that when current mode is switched to a mouse or game mode, movement of a pointer or a game character is performed using one of the two input units and various operation commands for operation of the pointer or the game character are executed using a remaining input unit.

It is preferred that one of the two input units is assigned vowels.

When in a state in which one of the first directional input and the second directional input is primarily performed, remaining input is subsequently performed, combined directional input in which a third character assigned to this input action is input is provided to be performed.

Here, the combined directional input is configured such that different characters may be input according to a sequence of the first directional input and the second directional input that are combined with each other.

Further, the character input device according to the present invention further includes a protrusion protruding from a center of the input unit, thus enabling an operation of the input unit to be smoothly performed when the first directional input or the second directional input is performed.

The input unit comprises one or more projections formed at an edge of a top thereof so as to facilitate contact and operation of a finger.

When current mode is switched to a mouse input mode, movement of a pointer can be performed through the first directional input of the input unit and a function of left/right buttons or a scroll function of the mouse is performed through the second directional input of the input unit.

When current mode is a game mode, movement of a character can be performed through the first directional input and various operation commands for the character are executed through the second directional input.

The character input device according to the present invention further includes a connection element including a band-shaped main body, a receiving part provided on the main body and configured to receive the input unit so that first directional input and second directional input are performed, and movable support parts provided at both ends of the main body and slidably coupled to the base.

Further, operation rod, one end of which is inserted into the protrusion is provided and the protrusion is provided with a coupling portion into which the operation rod is inserted.

One of the two input units may be used to input characters, and a remaining input unit may be used to perform movement of a mouse pointer/game character, direction indication, function commands or mode switch.

The input units are provided such that second directional input thereof is performed in two or more steps, that is, in multiple steps, and thus characters may be input through second directional input of each input unit and movement of a mouse pointer/game character, direction indication, function commands or mode switch may be performed through first directional input of each input unit.

On the other hand, the first directional input is performed by movement to the first direction indication locations and the second directional input is performed by pressing of the input unit corresponding to the second direction indication locations, and new data is radially assigned to the second direction indication locations through the first directional input and one piece of data may be selected from among the new data through the second directional input.

The first directional input is performed by movement to the first direction indication locations and the second directional input is performed by pressing of the input unit corresponding to the second direction indication locations, and new data is radially assigned to the first direction indication locations through the second directional input and one piece of data may be selected from among the new data through the first directional input.

In addition, in order to accomplish the above objects, the present invention provides a character input device, comprising a base; two input units provided on the base, wherein each of the input units is configured to perform in two or more steps, that is, multiple steps, first directional input in which the input unit is moved from each reference location to any one of four first direction indication locations arranged radially around the reference location and spaced apart from one another, and second direction input in which any one of four second direction indication locations arranged radially on the input unit itself and spaced apart from one another is selected; a first detection unit for detecting the first directional input; a second detection unit for detecting the second directional input; and a control unit for extracting a first character assigned to a first direction indication location at which the movement of the input unit is detected, or a second character assigned to a second direction indication location at which the second directional input is detected, from a memory unit.

In order to accomplish the above objects, the present invention provides a character input device, comprising a base; two input units provided on the base, wherein each of the input units is configured to perform in two or more steps, that is, multiple steps, first directional input in which the input unit is moved from each reference location to any one of eight first direction indication locations arranged radially around the reference location and spaced apart from one another, and second direction input in which any one of four second direction indication locations arranged radially on the input unit itself and spaced apart from one another is selected; a first detection unit for detecting the first directional input; a second detection unit for detecting the second directional input; and a control unit for extracting a first character assigned to a first direction indication location at which the movement of the input unit is detected, or a second character assigned to a second direction indication location at which the second directional input is detected, from a memory unit.

In order to accomplish the above objects, the present invention provides a character input device, comprising a base; two input units provided on the base, wherein each of the input units is configured to perform in two or more steps, that is, multiple steps, first directional input in which the input unit is moved from each reference location to any one of four first direction indication locations arranged radially around the reference location and spaced apart from one another, and second direction input in which any one of eight second direction indication locations arranged radially on the input unit itself and spaced apart from one another is selected; a first detection unit for detecting the first directional input; a second detection unit for detecting the second directional input; and a control unit for extracting a first character assigned to a first direction indication location at which the movement of the input unit is detected, or a second character assigned to a second direction indication location at which the second directional input is detected, from a memory unit.

Here, one or more of the first directional input and the second directional input may be provided to be performed in two or more steps, that is, in multiple steps.

In order to accomplish the above objects, the present invention provides a character input device, comprising a base; an input unit provided on the base, wherein the input unit is configured to independently perform first directional input in which the input unit slides from a reference location to any one of a plurality of first direction indication locations arranged radially around the reference location and spaced apart from one another within a predetermined input radius, and second directional input in which any one of press parts, provided on a top of the input unit to correspond to a plurality of second direction indication locations arranged radially on the input unit itself and spaced apart from one another, is selected; a first detection unit for detecting movement of the input unit; a second detection unit for detecting selection of the press parts; and a control unit for extracting a first character assigned to a relevant first direction indication location or a second character assigned to a relevant second direction indication location from a memory unit and inputting the character on a basis of results of detection by the first detection unit and the second detection unit.

In order to accomplish the above objects, the present invention provides a character input device, comprising a base; an input unit provided on the base, wherein the input unit is configured to independently perform first directional input in which the input unit slides from a reference location to any one of a plurality of first direction indication locations arranged radially around the reference location and spaced apart from one another within a predetermined input radius, and second directional input in which the input unit is tilted downwards to a direction of any one of a plurality of second direction indication locations arranged radially on the input unit itself and spaced apart from one another; a first detection unit for detecting movement of the input unit; a second detection unit for detecting tilting of the input unit; and a control unit for extracting a first character assigned to a relevant first direction indication location or a second character assigned to a relevant second direction indication location from a memory unit and inputting the character on a basis of results of detection by the first detection unit and the second detection unit.

In order to accomplish the above objects, the present invention provides a character input device, comprising a base; an input unit provided on the base, wherein the input unit is configured to independently perform first directional input in which the input unit slides from a reference location to any one of a plurality of first direction indication locations arranged radially around the reference location and spaced apart from one another within a predetermined input radius, and a second directional input in which the entire input unit is tilted downwards and moved to a direction of any one of a plurality of second direction indication locations arranged radially on the input unit itself and spaced apart from one another; a support unit disposed between the input unit and the base and configured to support tilting movement of the input unit while sliding together with the input unit; a first detection unit for detecting movement of the input unit; a second detection unit for detecting tilting movement of the input unit; and a control unit for extracting a first character assigned to a relevant first direction indication location or a second character assigned to a relevant second direction indication location from a memory unit and inputting the character on a basis of results of detection by the first detection unit and the second detection unit.

In order to accomplish the above objects, the present invention provides a character input device, comprising a base; an input unit provided on the base, wherein the input unit is configured to independently perform first directional input in which the entire input unit is tilted downwards and moved to a direction of any one of a plurality of first direction indication locations arranged radially around the reference location and spaced apart from one another, and second directional input in which the input unit is tilted downwards to a direction of any one of a plurality of second direction indication locations arranged radially on the input unit itself and spaced apart from one another; a support unit disposed between the base and the input unit and configured to support tilting movement of the input unit; a first detection unit for detecting movement of the input unit; a second detection unit for detecting tilting of the input unit; and a control unit for extracting a first character assigned to a relevant first direction indication location or a second character assigned to a relevant second direction indication location from a memory unit and inputting the character on a basis of results of detection by the first detection unit and the second detection unit.

Here, one or more of the first directional input or the second directional input may be provided to be performed in two or more steps, that is, in multiple steps.

In order to accomplish the above objects, the present invention provides a character input device, comprising a base; an input unit provided on the base and configured to include a movable input unit for performing first directional input in such a way that the movable input unit is moved from a reference location to any one of a plurality of first direction indication locations arranged radially around the reference location and spaced apart from one another, and a press input unit for performing second directional input in such a way that any one of a plurality of second direction indication locations arranged radially on the press input unit itself and spaced apart from one another is pressed; a first detection unit for detecting movement of the movable input unit; a second detection unit for detecting pressing of the press input unit; and a control unit for extracting a first character assigned to a first direction indication location at which the movement of the movable input unit is detected, or a second character assigned to a second direction indication location at which pressing of the press input unit is detected, from a memory unit and executing the first or second character.

Here, the movable input unit performs the first directional input by performing lateral movement.

The movable input unit may perform the first directional input by performing tilting movement.

The press input unit is operated in association with the movable input unit, and thus may be moved together with the movable input unit when the movable input unit performs first directional input.

A direction press input unit is arranged below the press input unit and at a location at which the direction press input unit is capable of coming into contact with the press input unit through second directional input performed using the press input unit even if the movable input unit performs the first directional input and the direction press input unit coming into contact with the second detection unit by contact of the press input unit is provided.

A direction press input unit is configured to support a bottom of the movable input unit and arranged at a location at which the direction press input unit is capable of coming into contact with the press input unit through second directional input performed using the press input unit even if the movable input unit performs the first directional input and the direction press input unit coming into contact with the second detection unit by contact of the press input unit is provided.

Furthermore, the movable input unit is formed in a shape of a stick, and the first detection unit is provided to correspond to a bottom of the movable input unit and configured to detect movement of the movable input unit.

Advantageous Effects

According to the character input device of the present invention, the input space can be minimized and each character can be precisely input according to a user's intensions.

Further, one-action one-phoneme input is possible by combination with the direction movement input and the direction press input, and thus enabling the rapid character input.

Furthermore, the input space can be minimized, so that the small size and slim structure of products can be realized, and thus application to various types of portable electronic devices, such as PDAs, notebook computers and portable mobile communication terminals, is possible.

BRIEF DESCRIPTION OF DRAWINGS

FIG. 15 is a table showing an embodiment of the arrangement of characters of various countries assigned to respective input actions in a character input device according to the present invention;

BEST MODE FOR CARRYING OUT THE INVENTION

Hereinafter, embodiments of the present invention will be described in detail with reference to the attached drawings.

Figure 1:
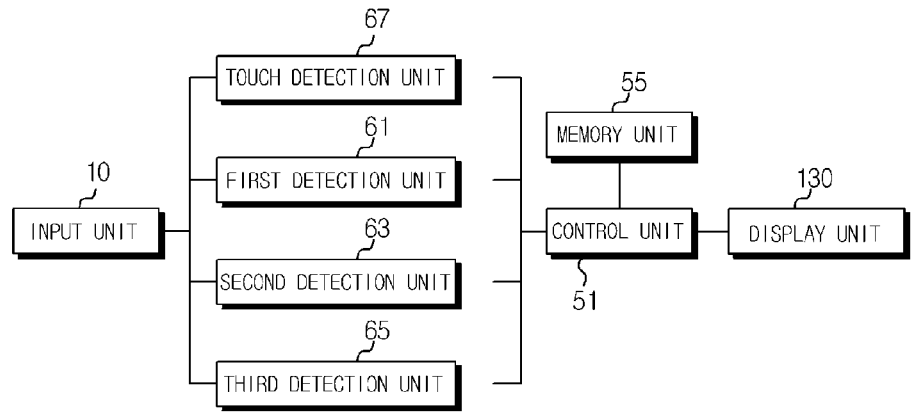
FIG. 1 is a block diagram showing the construction of a character input device according to the present invention.
Figure 2:
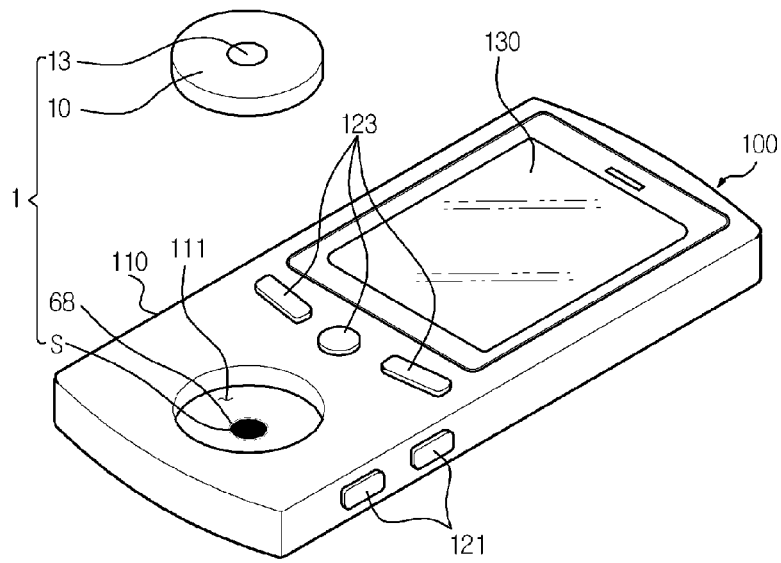
FIG. 2 is a perspective view of a portable mobile communication terminal equipped with a character input device according to the present invention.

FIG. 1 is a block diagram showing the construction of a character input device 1 according to the present invention, and FIG. 2 is a perspective view of a portable mobile communication terminal 100 equipped with the character input device 1 according to the present invention.

Referring to the drawings, the character input device 1 according to the present invention includes a base 110, an input unit 10 configured to independently perform first directional input M and second directional input P, a first detection unit 61 for detecting the movement of the input unit 10, a second detection unit 63 for detecting the second directional input, and a control unit 51 for extracting characters assigned to respective direction indication locations from a memory unit 55 on the basis of the results of the detection by the first detection unit 61 and the second detection unit 63 and for inputting the extracted characters.

Hereinafter, the construction and embodiments of the character input device 1 according to the present invention will be described in detail for respective input actions with reference to the attached drawings.

First Directional Input M

In the present specification, the term "first directional input M" means an action in which the input unit 10 moves from a reference location S to any one of a plurality of first direction indication locations $M_1, M_2, \ldots$ arranged radially around the reference location S and spaced apart from one another, thus inputting a selected one of characters assigned to the first direction indication locations $M_1, M_2, \ldots$.

Figure 3:
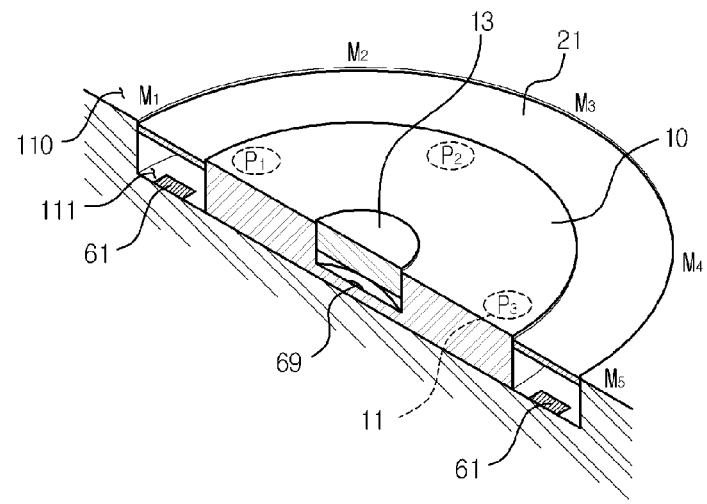
FIG. 3 is a sectional perspective view of a character input device according to an embodiment of the present invention.

FIG. 3 is a sectional view showing the coupling of the input unit 10 to the base 110 of FIG. 2 according to the present invention.

Referring to the drawing, the reference location S (refer to FIG. 2) is provided at a portion within an input radius 111 provided in the base 110, and a plurality of the first direction indication locations $M_1, M_2, \ldots$ is arranged radially around the reference location S and spaced apart from one another.

Further, first detection units 61 for detecting the movement of the input unit 10 to correspond to the respective first direction indication locations $M_1, M_2, \ldots$ are provided on the base 110.

Therefore, when the input unit 10 is moved from the reference location S to a predetermined one of the first direction indication locations $M_1, M_2, \ldots$, the control unit 51 extracts a first character assigned to the predetermined one of the first direction indication locations $M_1, M_2, \ldots$ from the memory unit 55 on the basis of a detection signal output from a first detection unit 61 which detected the movement of the input unit 10, and inputs the extracted character.

The first detection units 61 may be implemented in various types, for example, as pressure sensors, optical sensors or touch sensors, or may be implemented as a touch pad provided in the entire input radius 111, or may be provided using a track pointer.

In this case, the number of first direction indication locations $M_1, M_2, \ldots$ may be varied according to the circumstances. As shown in FIG. 3, eight first direction indication locations $M_1$ to $M_8$ may be provided, or four or six first direction indication locations may be provided.

The first directional input M may be performed through a variety of methods, for example, in such a way that the input unit 10 slides (or moves in a lateral direction, refer to FIG. 4(b)) from the state in which the input unit 10 is located at the reference location S (refer to FIG. 4(a)) toward a predetermined first direction indication location $M_5$.

Here, the term "sliding or lateral movement" includes all angles or directions from the reference location S to the first direction indication locations $M_1, M_2, \ldots$ without being limited to a state exactly horizontal to the bottom surface of the base 110.

In this case, at the time of performing first directional input M, the input unit 10 not only can move in a radial direction around the reference location S, but also can slide in a circumferential direction around the reference location S within the input radius 111, as shown in FIG. 5(c).

Figure 5:
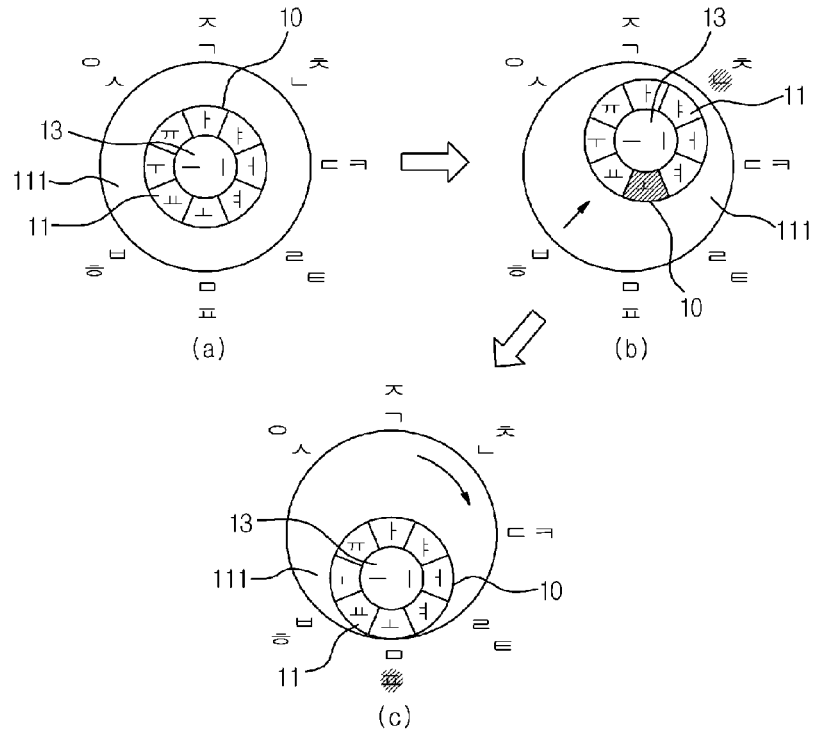
FIG. 5 is a diagram showing the radial movement and circumferential movement of an input unit according to the present invention.

FIG. 5 illustrates an action of inputting a character '늑' as input is performed for the Korean alphabet, wherein the input unit 10 slides from the reference location S toward one of the first direction indication locations $M_1, M_2, \ldots$ to which 'ㄴ' is assigned (refer to FIG. 5(b)), and then moves in a circumferential direction to input 늑 (refer to FIG. 5(c)).

The second directional input P and the input of the vowel 'ㅗ' will be described later.

In the above example, when the input unit 10 moves in the circumferential direction, this movement may be detected by the plurality of first detection units 61. In this case, the control unit 51 can determine only a detection signal output from a first detection unit 61, which detected only the terminus of movement of the input unit 10, to be valid.

Further, various types of function commands may be input through the circumferential movement of the input unit 10, for example, in such a way that, when the input unit 10 is moved counterclockwise in a circumferential direction, a cancel command is input, and when the input unit 10 is moved clockwise in a circumferential direction, a space command is input.

Figure 4:
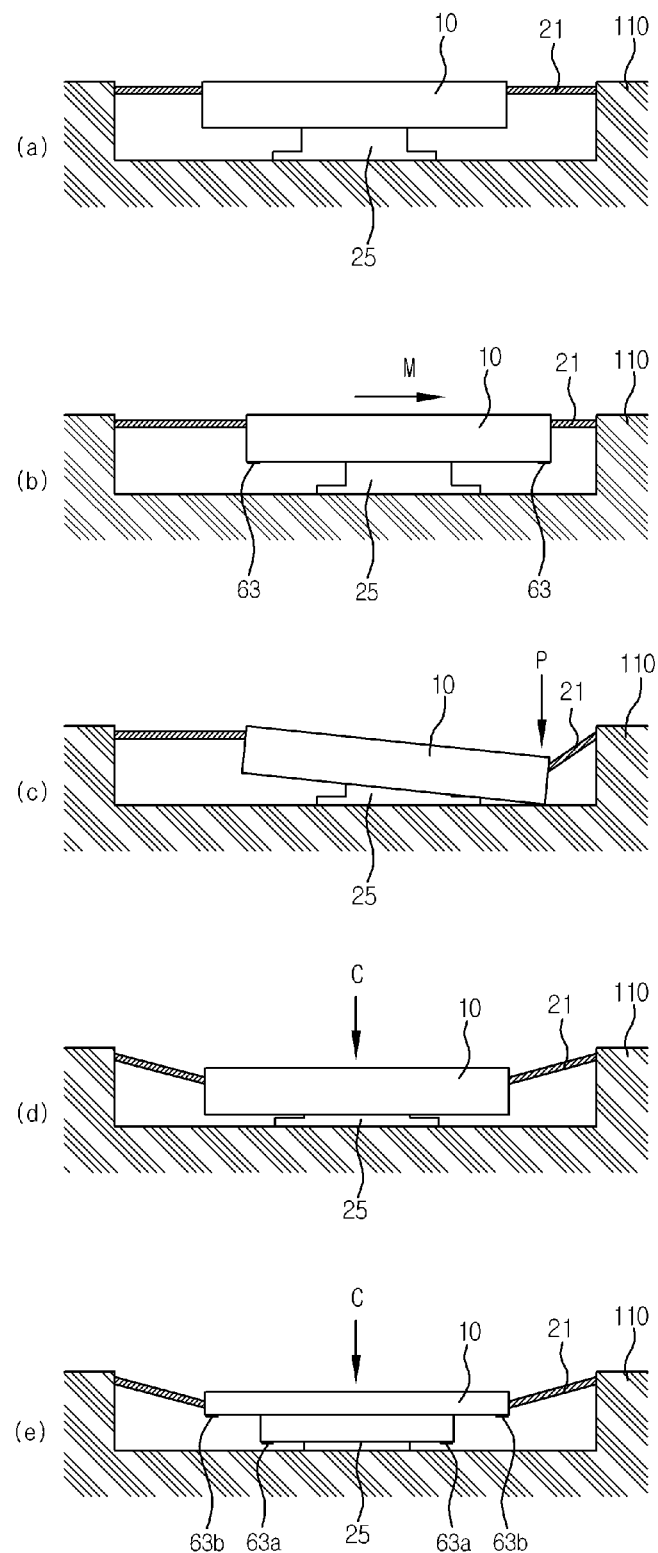
FIG. 4 is a diagram showing each input action at the time of performing first directional input, second directional input and central input using an input unit according to an embodiment of the present invention.

As shown in FIG. 4, a support unit 25 for supporting the movement of the input unit 10 may be further provided between the input unit 10 and the base 110.

Figure 6:
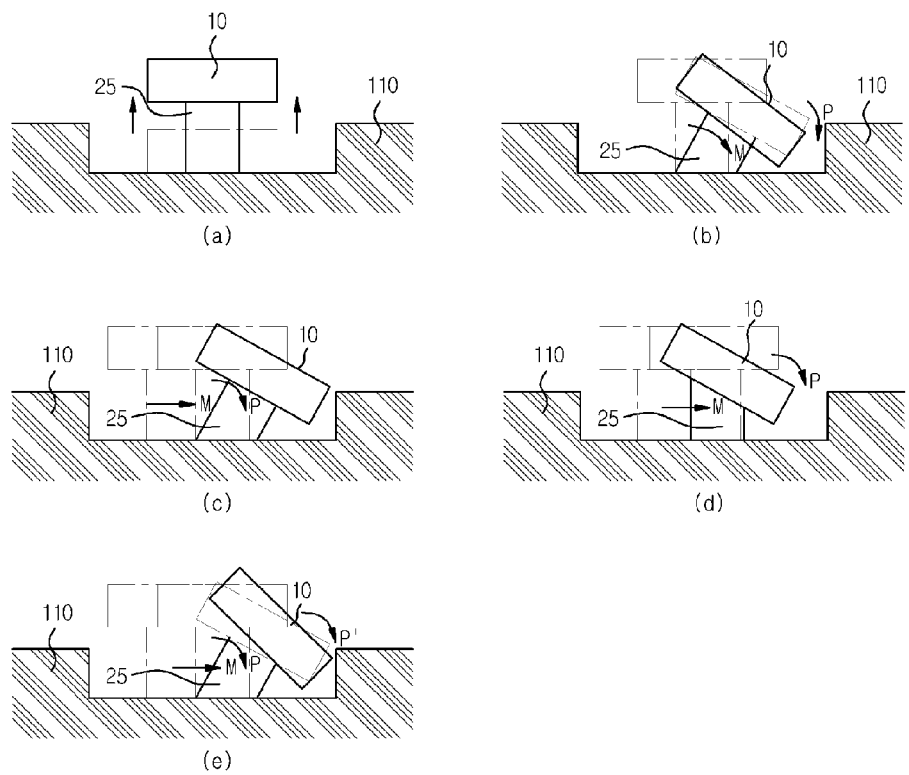
FIG. 6 is a diagram showing input actions in various embodiments in which first directional input and second directional input are combined with each other according to the present invention.

Meanwhile, as shown in FIG. 6, the first directional input M may be performed while the input unit 10 is tilted downwards to the direction of the first direction indication locations $M_1, M_2, \ldots$.

In this case, the character input device may further include the support unit 25 for supporting the input unit 10 at a predetermined height from the base 110.

Figure 7:
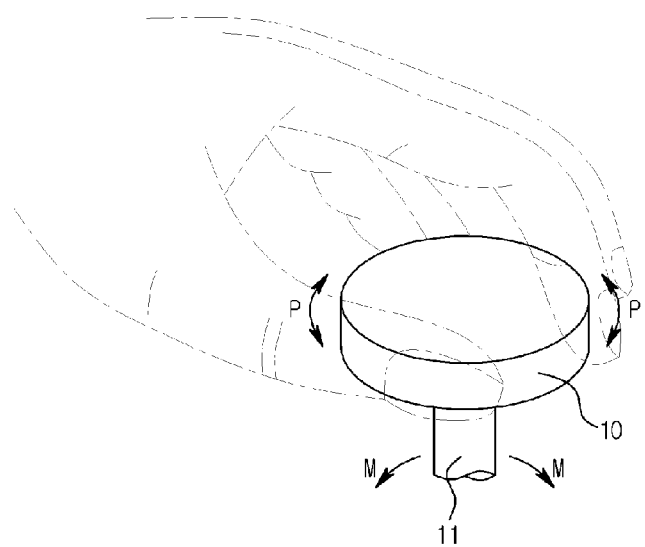
FIG. 7 is a diagram showing input being performed using an input unit according to an embodiment of the present invention.

Therefore, at the time of performing first directional input M, a character may be input by tilting the entire input unit 10 downwards to the direction of each of the first direction indication location $M_1, M_2, \ldots$ while holding the input unit 10 using two or more fingers (refer to 'M' of FIG. 6(b)), as shown in FIG. 7. At the time of performing second directional input P, a character may be input by tilting the input unit 10 downwards to the direction of a predetermined one of the second direction indication locations $P_1, P_2, \ldots$ with respect to the support unit 25 (refer to P of FIG. 6(b)).

Here, the operating type of the input unit 10 for first directional input M is not limited to the above embodiment, and the input unit 10 may be made of a material that can be partially or entirely deformed by external pressure and configured to detect the direction of deformation of the input unit 10 at the time of performing an input action.

Further, instead of providing the embodied input unit 10, a detection unit for detecting the movement of a finger (for example, a touch pad or a touch screen) may be provided, thus enabling first directional input M to be performed.

Meanwhile, a guide unit 40 for guiding the movement of the input unit 10 may be further provided on the base 110. The guide unit 40 enables the input unit 10 to accurately move in a direction intended by the user when the input unit 10 is moving, thus enabling accurate input to be performed without causing interference at the time of performing first directional input M.

The guide unit 40 may be provided to have various forms, for example, the form of a linear guide formed on the base 110 as a groove having a predetermined shape ranging from the reference location S to the respective first direction indication locations $M_1, M_2, \ldots$.

Further, as shown in FIG. 2, a disk-shaped depression which corresponds to the input radius 111 is formed on the base 110, thereby restricting the distance of the radial movement of the input unit 10 and guiding the circumferential movement of the input unit 10.

Figure 9:
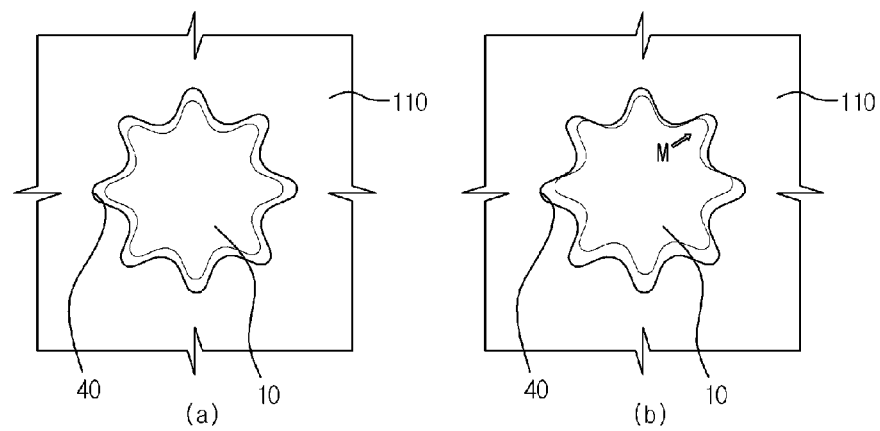
FIG. 9 is a plan view showing an input unit and a guide unit according to an embodiment of the present invention.

Further, as shown in FIG. 9, the guide unit 40 may be formed in the shape of recesses that are depressed to correspond to the first direction indication locations $M_1, M_2, \ldots$.

In this case, the input unit 10 is provided to have a shape corresponding to the guide unit 40, so that, as shown in FIG. 9(b), even if the user moves the input unit 10 in an inaccurate direction at the time of performing first directional input M, the input unit 10 may be moved to a desired one of the first direction indication locations $M_1, M_2, \ldots$ along the guide unit 40.

Figure 28:
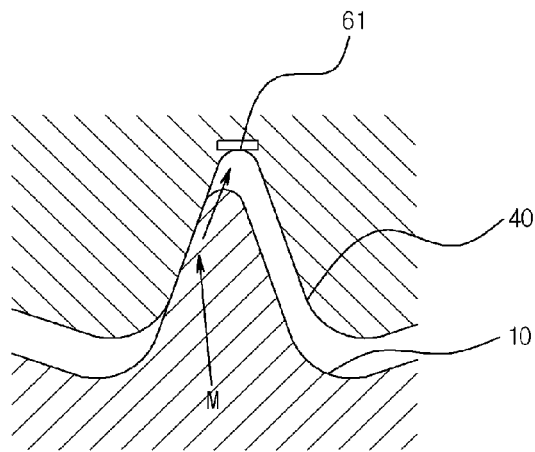

With reference to FIG. 28 showing the detailed structure of FIG. 9(b), the guide unit 40 will be described in detail.

The guide unit 40 may adjust the movement direction of the input unit 10 to an accurate direction when the user moves the input unit 10 in an inaccurate direction. However, unless the input unit 10 is moved in an accurate direction in which the detection units 61 are located, as shown in FIG. 28, the movement direction of the input unit 10 is compulsorily changed by the guide unit 40, and, additionally, a great force is required at the time of performing an input action, thus causing the user to undergo inconvenience.

Figure 27:
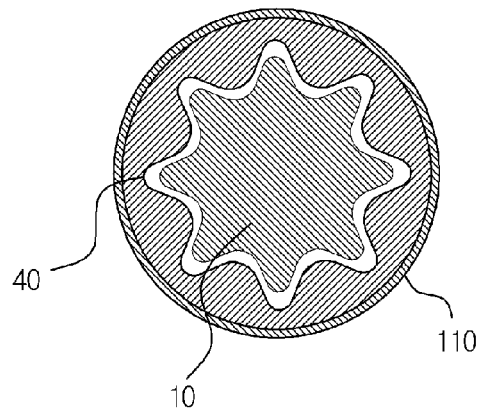
FIGS. 27 to 33 are plan views showing an input unit and a guide unit according to embodiments of the present invention.

In this case, if the guide unit 40 is deformable according to the operation of the input unit, the user can more easily and simply operate the input unit. Referring to FIG. 27, the guide unit 40 is fixed to the base 110, but an elastic part such as silicon is connected to one side of the guide unit 40, thus guiding the direction of the input unit 10 while the guide unit 40 is deformed according to with the operation of the input unit 10.

Figure 29:
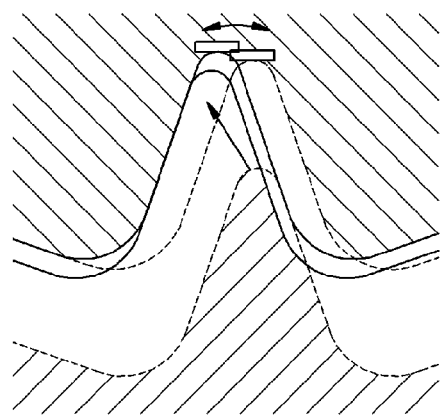

In more detail, as shown in FIG. 29, when the input unit 10 is moved into the guide unit 40 along the side surface of the guide unit 40, the guide unit 40 is moved in the same direction as the movement direction of the input unit 10, and the input unit 10 progresses in the same direction while pushing the guide unit 40, thus allowing the user to perform input without feeling resistance to the input action. The moved guide unit 40 is automatically returned to its original state because of its inherent elastic force after the movement of the input unit has been terminated.

In the above embodiment, when the guide unit 40 is deformed and moved, the detection units 61 may be moved together with the guide unit 40.

Further, according to the above embodiment, even if the user does not accurately move the input unit 10 in a desired input direction, the deformable guide unit 40 is moved along the progressing direction of the input unit 10, and the detection units 61 are moved together with the guide unit 40 and configured to detect the movement of the input unit 10, thereby allowing the user to complete input smoothly without feeling resistance thereto.

Figure 30:
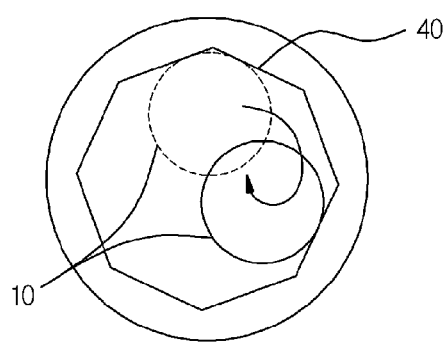
Figure 31:
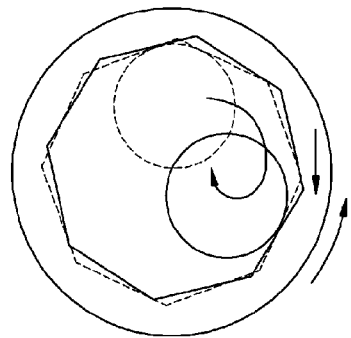

FIG. 31 illustrates another type of deformable guide unit 40, which guides the circumferential movement of the input unit 10. In the case where the guide unit 40 is fixed as shown in FIG. 30, if the force of circumferential movement of the input unit 10 exceeds the resisting force of a direction angle when the input unit 10 is moved in a circumferential direction after being moved from the reference location S towards the guide unit 40, the input unit can easily pass through a direction angle corresponding to a desired input direction, thus causing a problem in which a detection unit corresponding to a subsequent direction angle may detect movement.

In order to solve this problem, when the input unit 10 is moved in the circumferential direction after being moved in the direction of the guide unit 40, the guide unit 40 may function as a buffer for reducing the force of circumferential movement of the input unit 10 after slightly rotating along with the input unit, and the detection units are moved along with the guide unit, as shown in FIG. 31, thus enabling a detection unit located in a desired direction to be stably grounded to and attached to the input unit.

Further, when the support unit 25 is placed on the bottom of the input unit 10, the support unit 25 and not the guide unit 40 is moved or rotated, so that the same effect as the deformation of the guide unit 40 in the above embodiment may be produced.

Here, the guide unit 40 may be made of various materials, for example, an elastic material.

Meanwhile, first directional input M may be configured to be performed in two or more steps, that is, in multiple steps depending on the difference in the distance of movement of the input unit 10 or the intensity of pressure causing movement.

That is, when first directional input M is performed by the lateral movement (or sliding) of the input unit 10, as shown in FIG. 4(b), two or more first detection units 61 may be sequentially provided on the movement path of the input unit 10 ranging from the reference location S to the respective first direction indication locations $M_1, M_2, \ldots$.

Further, when first directional input M is performed by the tilting of the input unit 10, as shown in FIG. 6 or 7, one or more optical sensors for sensing the tilting of the input unit 10 or the support unit 25 may be provided depending on the angle of tilting.

Furthermore, as shown in FIG. 10(b), first contact portions 27a and a second contact portion 27b having different protruding lengths to correspond to each of the first direction indication locations $M_1, M_2, \ldots$ may be formed on an elastic element 21 formed on the circumferential portion of the input unit 10, or on the input unit 10 itself. In this case, relatively long first contact portions 27a primarily come into contact with the base 110 and the second contact portion 27b subsequently comes into contact with the base 110 according to the degree of movement of the input unit 10.

The contact portions 27a and 27b may be made of a conductive material.

Here, it is apparent that the detection scheme of the first detection units 61 for discriminatively detecting two-step input is not limited to the above example, and various modifications are possible.

An example of a signal processing method performed by the control unit 51 at the time of multi-step input will be described below.

For example, when two-step first directional input M is performed in two steps, first-step input is primarily performed. Therefore, after the first-step first directional input M, the control unit 51 detects whether second-step first directional input M has been performed within a predetermined waiting time, thereby determining whether two-step first directional input M has been performed.

Preferably, once a first-step first directional input M is performed, the control unit 51 immediately processes one-step input without waiting during the waiting time, but, when second-step input is performed within the waiting time, the control unit may cancel the one-step input and change the one-step input to two-step input. In this case, input is prevented from being delayed by the waiting time.

Furthermore, whether to change one-step input to two-step input may be determined depending on whether first-step input has been released (for example, whether the input unit is returned to the reference location S after first directional input M has been performed, or when a first-step input detection signal is released (off)), instead of whether a predetermined time has elapsed.

That is, when first-step input is released, the final input is determined.

In this way, when first-step input is performed, the input is immediately processed, and when the first-step input is released, final input is determined. However, regardless of the waiting time, when additional input is performed in the state in which first-step input has been performed without the first-step input being released, and then second-step input is performed, the first-step input is canceled, and it is changed to second-step input.

The above signal processing method enables faster input processing because, when one-step input is processed due to erroneous input at the time of performing two-step input, second-step input is immediately performed in the state in which first-step input has been performed, without the second-step input being performed after the first-step input has been canceled, and then the one-step input may be changed to two-step input.

As described above, in the case where input is immediately processed when a predetermined input signal is detected, but final input is determined only when input is released, when erroneous input is processed at the time of performing first directional input M or second directional input P, there is no need to erase processed input content and to perform input again, and it is possible to revise the erroneous input to desired input before the final input is determined, thus enabling input to be conveniently performed.

Further, when the first detection units 61 or the second detection units 63 are implemented as pressure sensors, input may be determined using the maximum pressure value generated within the waiting time.

Furthermore, one-step input and two-step input may be discriminated from each other on the basis of the detection time for which the first detection units 61 detect the input unit 10.

For example, when the detection time is less than 0.5 seconds, input may be determined to be one-step input, whereas, when the detection time is greater than 0.5 seconds, input may be determined to be two-step input.

Even in the case of pressure sensors, as described above, when first-step input is performed, the input is immediately processed, and when first-step input is released, final input is determined. Accordingly, when a detection value corresponding to second-step input is additionally detected before the first-step input is released, the first-step input is canceled, and the second-step input may be determined to be being input.

Here, it should be noted that signal processing performed by the control unit 51 related to the above-described multi-step input may be equally applied to second directional input P, central input C, combined directional input MP and PM, and combined central input CM and CP, as well as the first directional input M.

As described above, when first directional input M is implemented in multiple steps, the number of assigned characters (or the number of characters that can be input through first directional input M) increases in proportion to the number of steps.

Therefore, in the case where a larger number of characters is desired to be input through first directional input M, this may be solved through multi-step input without increasing at will the number of first direction indication locations $M_1$, $M_2$, . . . , so that an optimal input environment can be realized by suitably controlling the number of first direction indication locations $M_1$, $M_2$, . . . and the determination of whether to perform input in multiple steps.

Meanwhile, when two of first direction indication locations $M_1$, $M_2$, . . . are simultaneously selected at the time of first directional input M, for example, when the input unit 10 is moved to an intermediate portion between the two first direction indication locations $M_1$ and $M_2$ and the movement of the input unit 10 is simultaneously detected by two first detection units 61, interference between input signals may occur.

In this case, the control unit 51 can determine only a detection signal that was generated first, from among a plurality of detection signals, to be a valid signal.

That is, the signal that was input first is input as a valid signal, and other signals that are input before the first input signal is released (for example, before the input unit is returned to the reference location S after performing first directional input M) or that are input within a predetermined period, may be ignored.

As another method, all signal values that can be detected to be subject to interference may be arranged into a database and then processed. For example, when detection signals are generated by one, two or three first detection units 61 at a predetermined location, input values in respective cases are arranged into a database, and thus corresponding input values are output from the database when the predetermined signals are detected.

When the first detection units 61 are implemented as pressure sensors, only a detection location having the maximum pressure value can be determined to be a valid location.

The input unit 10 may be provided to have various shapes.

For example, the input unit may be provided in the shape of a circular plate, as shown in FIG. 2, in the shape of a polygonal plate, or in the shape in which side portions protrude toward the respective first direction indication locations $M_1$, $M_2$, . . . , as shown in FIG. 9.

Figure 10:
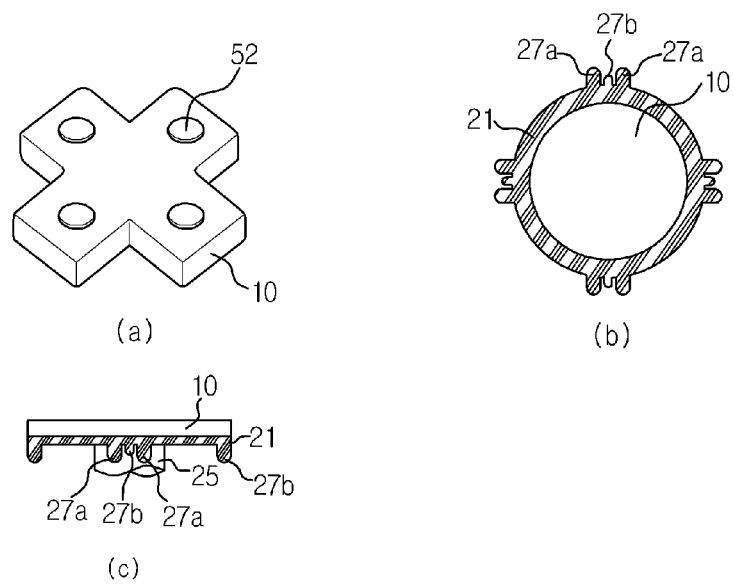
FIG. 10 illustrates a perspective view, a plan view, and a sectional view of an input unit according to various embodiments of the present invention.

Further, as shown in FIG. 10(*a*), when the input unit 10 has four second direction indication locations $P_1$, $P_2$, . . . , it may be formed in the shape of a cross.

In this case, button-shaped protrusions 52 may be formed on the top of the input unit 10 to correspond to the respective second direction indication locations $P_1$, $P_2$, . . . .

The input unit 10 may be made of various materials, for example, an elastic material.

Figure 26:
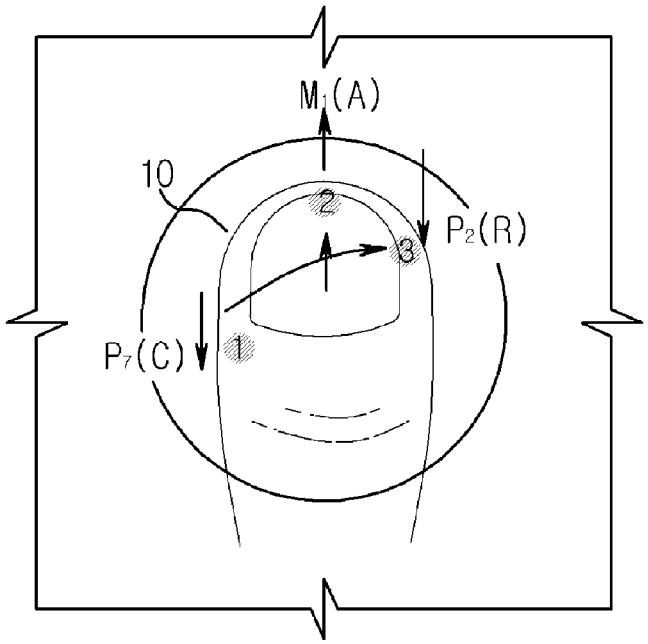
FIG. 26 is a view showing an example in which a character is input using an input unit in a character input device according to an embodiment of the present invention.

At the time of first directional input M, the radius of movement of the input unit 10 is not limited. Preferably, as shown in FIG. 26, the radius of movement may be provided such that the input unit 10 is movable within the radius of movement of one finger touching the input unit 10.

Figure 11:
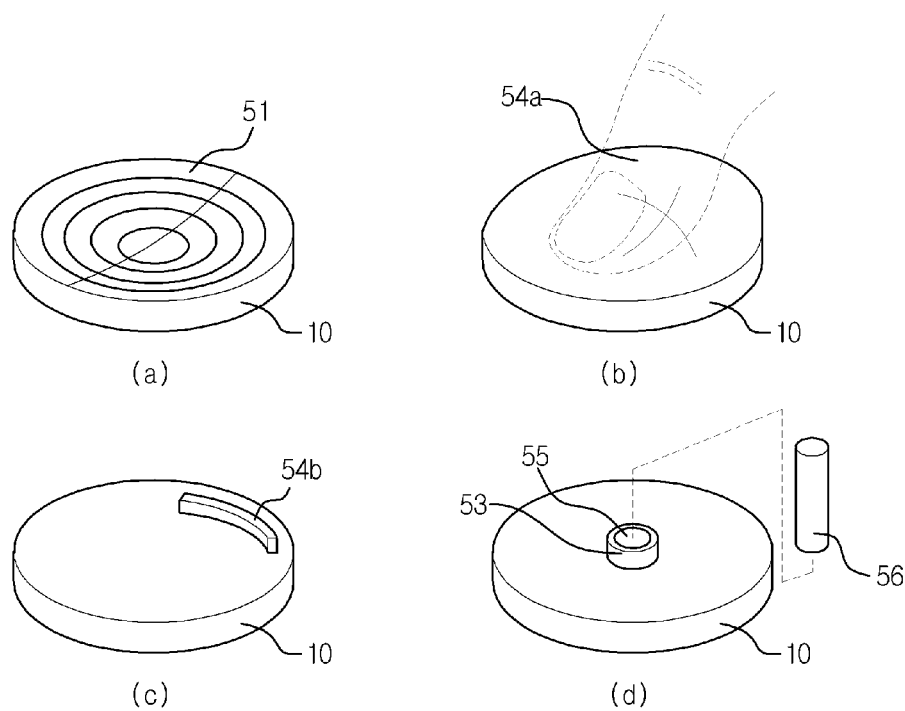
FIG. 11 illustrates perspective views of an input unit according to various embodiments of the present invention.

As shown in FIG. 11(*a*), a non-slip member 51 may be provided on the top of the input unit 10 so that a finger touching the input unit 10 is prevented from slipping at the time of performing first directional input M.

The non-slip member 51 may be formed in various forms. For example, rugged portions may be formed on the top of the input unit 10, or a depression may be formed at the center of the input unit 10.

Further, as shown in FIG. 11(*b*) or (*c*), a projection 54*a* or 54*b* may be formed on a portion of the top of the input unit 10 so that the touching and operation of the finger are facilitated at the time of performing second directional input P.

Meanwhile, as shown in FIG. 11(*d*), the input unit 10 may further include a protrusion 53 formed to protrude from the center of the top thereof and configured to facilitate the operation of the input unit 10 at the time of performing first directional input M or second directional input P.

The protrusion 53 is configured to easily perform input even if the index finger or the middle finger as well as the thumb is used when the character input device 1 of the present invention is used, with the character input device placed on the table or the surface of the ground.

The protrusion 53 may be formed in various shapes, for example, in a ring shape, as shown in FIG. 11(*d*), or a convex or concave shape.

Meanwhile, the input unit 10 may further include an operation rod 56, one end of which is inserted into the protrusion 53, and the protrusion 53 is provided with a coupling portion 55 into which the operation rod is inserted, so that the input unit 10 may be operated, with the operation rod 56 inserted into the protrusion 53.

Second Directional Input P

In the present specification, the term "second directional input P" means an action of inputting a second character assigned to a selected one of a plurality of second direction indication locations $P_1$, $P_2$, . . . arranged radially on the input unit 10 itself and spaced apart from one another by selecting one of the second direction indication locations $P_1$, $P_2$, . . . .

That is, first directional input M is performed in such a way that the entire input unit 10 is moved toward the first direction indication locations $M_1$, $M_2$, . . . arranged outside the input unit 10, whereas second directional input P is performed in such a way that the second direction indication locations $P_1$, $P_2$, . . . , arranged on the input unit 10 itself are selected, wherein the lateral movement (or sliding) and tilting movement of the entire input unit 10 are not performed.

The second directional input P may be formed using various methods. For example, as shown in FIG. 4(*c*), it may be performed in such a way that the input unit 10 is tilted downwards to the direction of any one of the second direction indication locations $P_1$, $P_2$, . . . .

In this case, a support unit 25 for supporting the input unit 10 so that the input unit 10 can be tilted downwards in a certain radial direction from an initial horizontal state may be further provided between the bottom of the input unit 10 and the base 110.

Further, as shown in FIG. 5, second directional input P may be performed by selecting one of press parts 11 which are provided on the input unit 10 to correspond to the respective second direction indication locations $P_1$, $P_2$, . . . .

Here, the press parts 11 include all shapes enabling respective second direction indication locations $P_1$, $P_2$, . . . to be independently selected (except for in cases of the tilting of the input unit 10 itself) on the top of the input unit 10.

For example, the press parts 11 may be push buttons or push switches separately provided on the input unit 10 to correspond to the second direction indication locations $P_1$, $P_2$, . . . . Alternatively, the press parts 11 may be press locations provided on the top of the input unit 10 and provided with only second detection units 63 to correspond to respective second direction indication locations $P_1$, $P_2$, . . . .

Meanwhile, in second directional input P, circumferential input is also possible as in the case of first directional input M, and input functions and signal processing related to circumferential input are identical to those of the first directional input M.

Here, the input unit 10 may be provided to have various sizes. Preferably, as shown in FIG. 26, when the press parts 11 are provided on the top of the input unit 10, the input unit 10 may be provided to have such a size as to select each press part 11 within the radius of movement of one finger.

Further, when second directional input P is performed by the tilting of the input unit 10, the input unit 10 is preferably provided to have such a size as to tilt the input unit 10 downwards to the direction of the second direction indication locations $P_1$, $P_2$, . . . by tilting the finger in the state in which the finger comes into contact with the input unit 10, as shown in FIG. 11(*b*).

Figure 32:
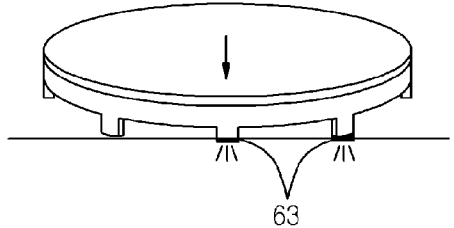
Figure 33:
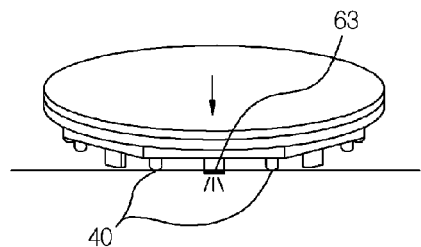

Further, when the input unit is provided as shown in FIG. 32, two or more second detection units 63 may simultaneously detect the pressing of the input unit 10 when the input unit 10 is pressed. In order to prevent this situation, the input unit 10 is configured such that an elastic element is disposed below an upper element, and guide units 40 are provided below the elastic element, as shown in FIG. 33. The guide units 40 are implemented such that hard projections slightly lower than the height of the second detection units 63 are formed at regular intervals. When the user presses the input unit 10, only one second detection unit 63 reacts to the action of the input unit due to the hard guide units 40, and thus interference does not occur.

The second detection units 63 may be variously provided according to the form in which second directional input P is performed.

For example, when second directional input P is performed by the tilting of the input unit 10, steps, which sequentially come into contact with the base 110 as the input unit 10 is tilted downwards, may be provided on a circumferential portion of the bottom of the input unit 10, and the second detection units 63 may be provided on the steps or the base 110 and implemented as touch sensors for sensing the contact of the input unit 10 with the base 110, or optical sensors for sensing the tilting of the input unit 10.

Furthermore, when second directional input P is performed by the respective press parts 11 provided on the input unit 10, the second detection units may be implemented as touch sensors, push switches or pressure sensors provided below the respective press parts 11.

Meanwhile, second directional input P may be provided to be performed in two or more steps, that is, in multiple steps.

For example, respective input actions of multi-step input may be discriminatively performed depending on the degree of the tilting of the input unit 10, the intensity of pressing of the press parts 11 or the difference in the distance of pressing.

Referring to FIG. 4(*e*), when second directional input P is implemented in two steps, multi-step input may be performed in such a way that steps are formed along the circumferential portion of the bottom of the input unit 10, lower second detection units 63*a* come into contact with the base 110 by the first-step tilting of the input unit 10, and upper second detection units 63b come into contact with the base 110 by second-step tilting of the input unit 10.

Further, as shown in FIG. 10(c), first contact portions 27a and a second contact portion 27b having different protruding lengths may be provided on the elastic element 21 that is formed on the bottom of the input unit 10, or the input unit 10 itself to correspond to the respective second direction indication locations $P_1, P_2, \ldots$. In this case, the first contact portions 27a having a relatively large length primarily come into contact with the base 110 and the second contact portion 27b subsequently comes into contact with the base 110 depending on the degree of the tilting of the input unit 10.

Here, the contact portions 27a and 27b may be made of an elastic conductive material.

In this case, the same method as that in the case of the first directional input M may be used for the signal processing performed by the control unit 51 when multi-step second directional input P is performed.

Meanwhile, the input unit may be configured such that touch input, enabling other characters assigned together to each of the second direction indication locations $P_1, P_2, \ldots$ to be input by detecting approach to or contact with each of the second direction indication locations $P_1, P_2, \ldots$ is performed.

Figure 8:
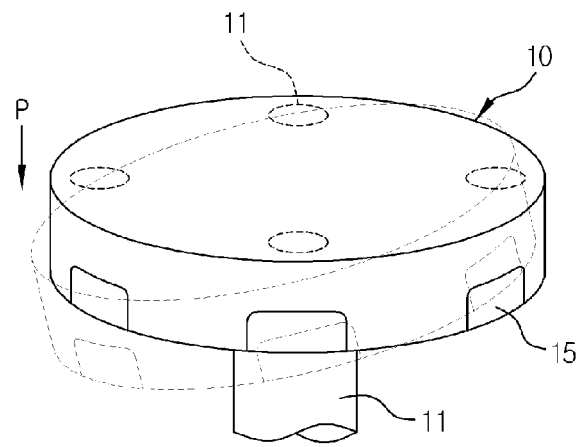
FIG. 8 is an enlarged perspective view of the input unit of FIG. 7.

In this case, as shown in FIG. 8, touch detection units 67 for detecting the approach or contact of the finger may be provided on the upper portions of the input unit 10 or the respective press parts 11 corresponding to the respective second direction indication locations $P_1, P_2, \ldots$.

For example, in FIG. 8, the letter 'A' is input by contact with a second direction indication location P2, and the letter 'B' is input through second directional input P at the second direction indication location $P_2$.

Therefore, the number of characters that can be assigned to the second direction indication locations $P_1, P_2, \ldots$ can be increased by way of touch input. When the second directional input P is implemented in multiple steps, more characters can be assigned.

Here, the number of first direction indication locations $M_1, M_2, \ldots$ and the number of second direction indication locations $P_1, P_2, \ldots$ may be implemented as various numbers, for example, a number corresponding to one of four to 12 directions.

In this case, the number of first direction indication locations $M_1, M_2, \ldots$ and the number of second direction indication locations $P_1, P_2, \ldots$ are preferably equal to or less than 8. The reason for this is that the accuracy of input may be deteriorated because the interval between respective direction indication locations is decreased when the number of input directions that can be manipulated using a person's finger is greater than 8.

With regard to the insufficiency of the number of direction indication locations, central input C, which will be described later, is combined with the direction indication locations, or the input unit 10 is provided in two sets on left and right sides, thus realizing optimal input conditions while enabling all characters required for input to be arranged.

Further, the number of first direction indication locations $M_1, M_2, \ldots$ may be identical to or different from the number of second direction indication locations $P_1, P_2, \ldots$.

Embodiments of Combination of First Directional Input M with Second Directional Input P Hereinafter, in the character input device 1 according to the present invention, representative embodiments in which first directional input M is combined with second directional input P will be described.

First, as a first embodiment, as shown in FIG. 3, first directional input M is performed in such a way that the input unit 10 slides from the reference location S toward first direction indication locations $M_1, M_2, \ldots$, and second directional input P is performed in such a way that press parts 11 provided on the top of the input unit 10 to correspond to respective second direction indication locations $P_1, P_2, \ldots$ are selected.

In FIGS. 4 and 6(d), a character input device 1 according to a second embodiment of the present invention is shown. Referring to the drawings, first directional input M is performed in such a way that the input unit 10 slides from the reference location S toward first direction indication locations $M_1, M_2, \ldots$, and second directional input P is performed in such a way that the input unit 10 is tilted downwards to the direction of any one of the second direction indication locations $P_1, P_2, \ldots$ from the horizontal position.

Here, a support unit 25 for supporting the input unit 10 to enable the tilting of the input unit 10 may be further provided. Of course, the support unit 25 may be implemented in various shapes.

Further, it is apparent that the input unit 10 itself may be made of an elastic material without the support unit 25 being separately provided, and that a deformable elastic part may be provided between the input unit 10 and the base 110, thus enabling the input unit 10 to be tilted downwards.

In FIG. 6(c), a character input device 1 according to a third embodiment of the present invention is shown. That is, FIG. 6(c) illustrates an example of the lateral movement and tilting movement of the input unit 10 supported by a stick-shaped support unit 25, and shows that lateral movement and tilting movement defined in the present specification can be variously modified regardless of the detailed shapes of the support unit 25 and the input unit 10.

Referring to the drawing, first directional input M is performed in such a way that the input unit 10 slides from a reference location S toward first direction indication locations $M_1, M_2, \ldots$, and second directional input P is performed in such a way that the input unit 10 is tilted downwards and moved to the direction of any one of second direction indication locations $P_1, P_2, \ldots$.

Figure 34:
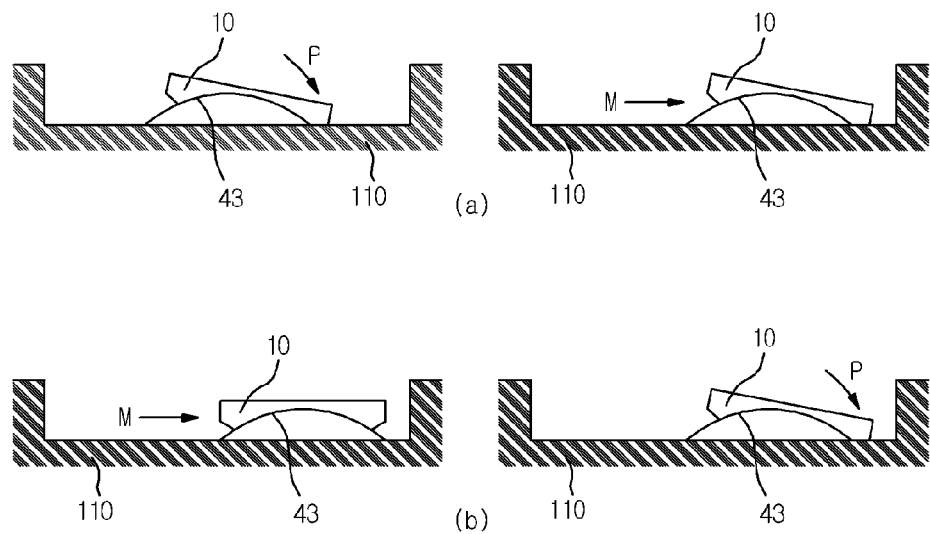
FIG. 34 is a diagram showing the input action of an input unit according to an embodiment of the present invention.

With reference to FIG. 34, a modification of the third embodiment is described. A character input device according to this modification is also provided to independently and sequentially or simultaneously perform first directional input M based on the lateral movement of the input unit 10 and second directional input P based on the tilting movement of the input unit 10, similarly to the above third embodiment.

That is, FIG. 34(a) shows that, after second directional input P is performed in such a way that the input unit 10 is tilted downwards and moved, first directional input M is performed in such a way that the input unit 10 is moved in a lateral direction, with the input unit 10 tilted downwards and moved. FIG. 34(b) shows that first directional input M based on the lateral movement of the input unit 10 is primarily performed, and second directional input P based on the tilting movement of the input unit 10 is subsequently performed.

In the third embodiment and modification thereof, the term 'tilting movement' means an action in which the input unit 10 is moved to a predetermined direction while the entire portion thereof is tilted downwards to the predetermined direction (or simultaneously with the support unit 25), and 'M' of FIG. 6(b), 'P' of FIG. 6(c) and 'P' of FIG. 6(e) corresponds to the tilting movement.

Meanwhile, the term 'tilting' means an action in which the input unit 10 is tilted downwards with respect to the support unit 25, and 'P' of FIG. 6(b), 'P' of FIG. 6(d), and 'P'' of FIG. 6(e) correspond to the tilting.

Here, although not being the above-described 'tilting movement', first directional input M may be performed by the sliding of the input unit 10 and second directional input P may be performed by the tilting of the input unit 10, as shown in FIG. 6(*d*) and FIG. 34.

Furthermore, as shown in FIG. 6(*e*), the input unit may be tilted downwards at its position (refer to P'), together with an action in which first directional input M is performed by sliding and second directional input P is performed by tilting movement in FIG. 6(*c*).

In this case, a plurality of side press parts 15 (refer to FIG. 8) may be further provided along the circumference of the side surface of the input unit 10.

The side press parts 15 are provided separately from the press parts 11 for second directional input P, and characters may be assigned to the respective side press parts 15, or, alternatively, symbols, numbers or various function commands may be assigned to the side press parts 15.

In the above embodiments, the input unit 10 may be provided to be extended from and retracted to the base 110, as shown in FIG. 6(*a*).

Therefore, when the input unit 10 is retracted to the base 110, the volume of the device can be minimized, and when the input unit 10 is extended, the manipulation of the input unit is facilitated.

However, it is apparent that it is possible to provide the input unit 10 to protrude from the base 110 without extending and retracting the input unit 10 from and to the base 110.

In FIG. 6(*b*), a character input device 1 according to a fourth embodiment of the present invention is shown.

Referring to the drawing, first directional input M is performed by the 'tilting movement' of the input unit 10, and second directional input P is performed by the tilting of the input unit 10.

Figure 35:
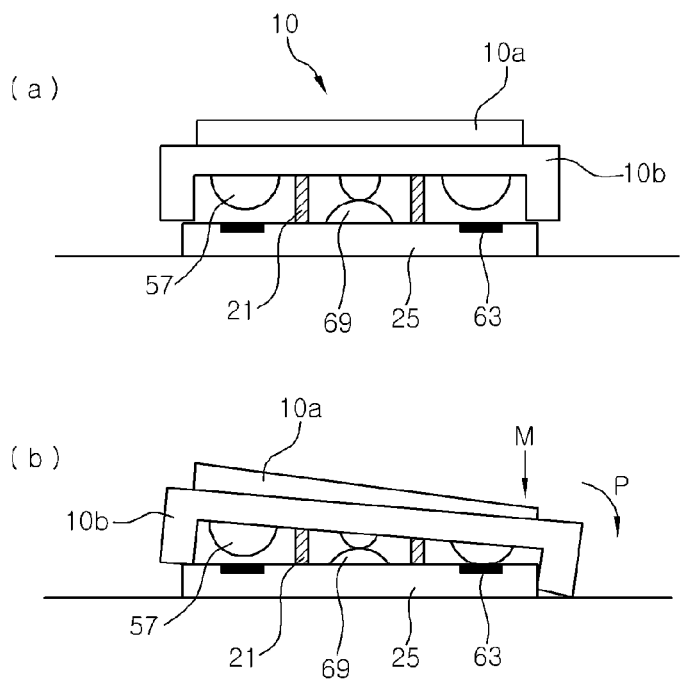
FIGS. 35 to 41 are views showing input units according to various embodiments of the present invention.

In FIG. 35, a character input device according to a fifth embodiment of the present invention is shown.

Referring to FIG. 35(*a*), in the character input device of the present embodiment, detection units 63 are installed on a support unit 25. Further, a tilt portion 10*b* enabling a relevant character to be input by the tilting of the tilt portion 10*b* to the direction of a relevant second direction indication location is disposed on the top of the support unit 25, and elastic elements 21 having elasticity are installed between the support unit 25 and the tilt portion 10*b* so as to enable the movement and return of the tilt portion 10. Contact projections 57 corresponding to the detection units 63 are provided on the inner side of the tilt portion 10*b*. In this case, both the contact projections 57 and the detection units 63 are provided to correspond to the second direction indication locations.

Further, a press unit 10*a* is formed on the top of the tilt portion 10*b* so that a character assigned to a relevant first direction indication location is input by pressing.

Through such a character input device, as shown in FIG. 35(*b*), first directional input M is performed in such a way that a specific second direction indication location of the press unit 10*a* is pressed, and second directional input P is performed in such a way that the tilt portion 10*b* is tilted downwards to the direction of a specific first direction indication location and then the corresponding contact projection 57 of the tilt portion 10*b* comes into contact with the detection unit 63.

Figure 36:
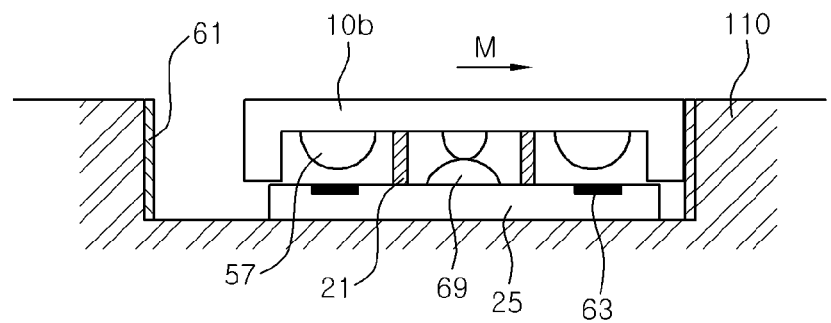
Figure 36:
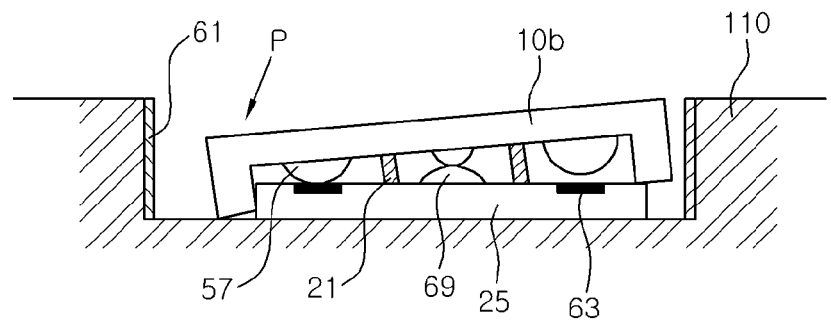

Meanwhile, FIG. 36 illustrates modifications of the fifth embodiment of the present invention.

As shown in the drawing, in the present modification, first directional input M is performed in such a way that a tilt portion 10*b* comes into contact with detection units 61 installed on the base 110 through the lateral movement of the support unit 25 (refer to FIG. 36(*a*)), and second directional input P is performed in such a way that the contact projection 57 of the tilt portion 10*b* comes into contact with the detection unit 63 on the support unit 25 by the tilting of the tilt portion 10*b* (refer to FIG. 36(*b*)).

Figure 37:
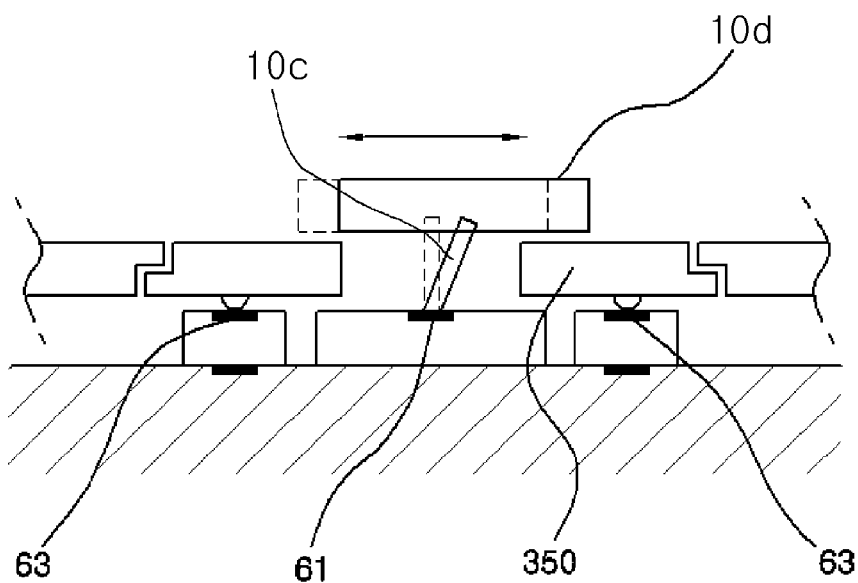
Figure 38:
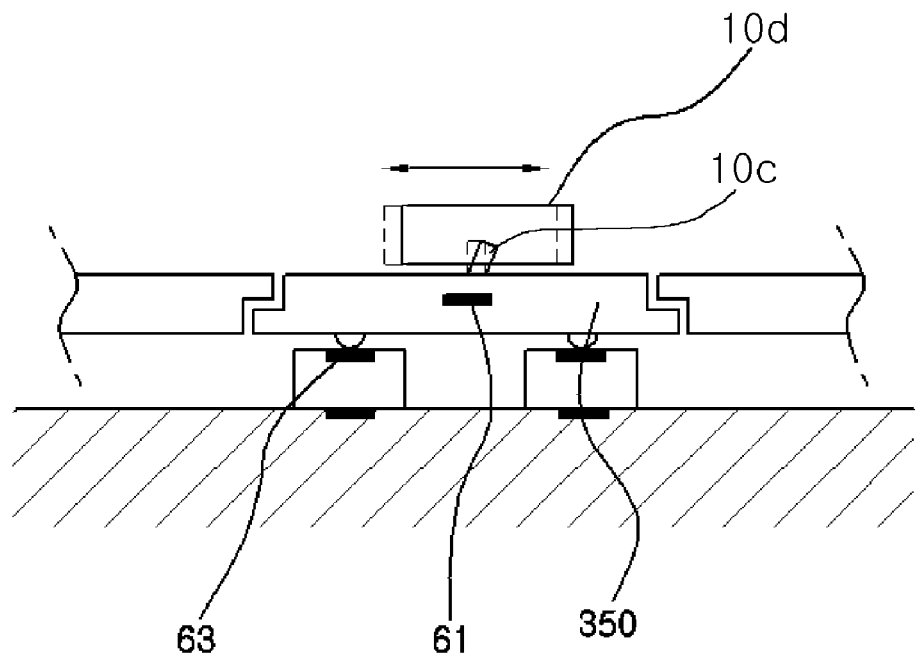

Meanwhile, in FIGS. 37 and 38, a character input device according to a sixth embodiment of the present invention is shown.

As shown the drawings, in the present embodiment, an input unit 10 is configured to be separated into a movable input unit 10*c* and a press input unit 10*d* and to perform first directional input M using the movable input unit 10*c* and second directional input P using the press input unit 10*d*. This embodiment is characterized in that the press input unit 10*d* has such an area as to cover each direction press input unit 350 so that second directional input P can be performed in all directions even in the state in which the movable input unit 10*c* has been moved.

In detail, in the present embodiment, as shown in FIGS. 37 and 38, the character input device is configured such that, when a stick-shaped movable input unit 10*c* is tilted downwards, this tilting is detected by a detection unit 61. At this time, first directional input M is performed by the tilting of the movable input unit 10*c*.

Further, when the movable input unit 10*c* is tilted downwards, the press input unit 10*d* is moved in a lateral direction. At this time, when the press input unit 10*d* is pressed, it presses the direction press input unit 350, so that the detection unit 63 is pressed, and thus second directional input P is performed.

Figure 39:
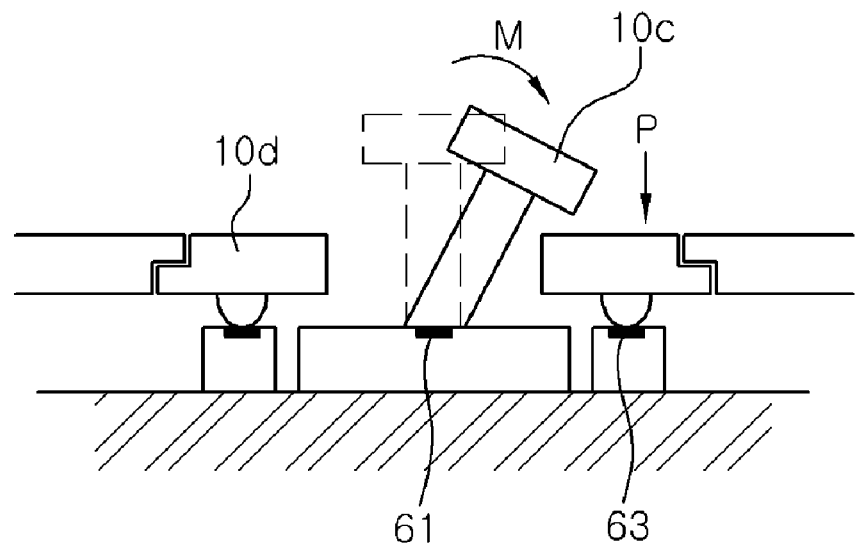
Figure 40:
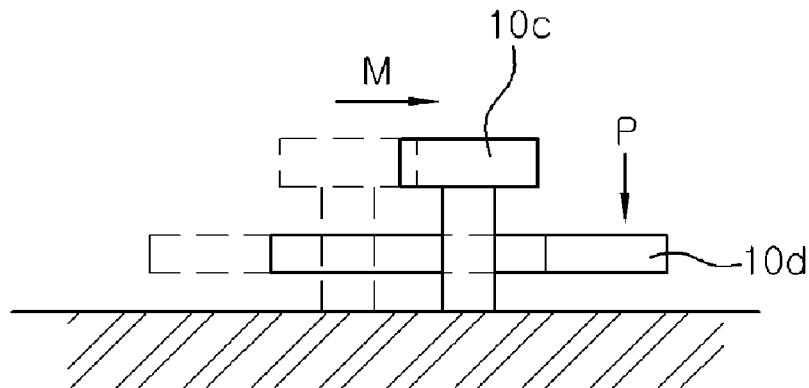

Meanwhile, in FIGS. 39 and 40, modifications of the character input device according to the sixth embodiment are shown.

Referring to FIG. 39, a movable input unit 10*c* can be independently tilted downwards and moved, and first directional input M is performed by this tilting movement. That is, as a detection unit 61 detects the tilting of the movable input unit 10*c*, input is processed.

Further, a press input unit 10*d* is configured separately from the movable input unit 10*c*. When the press input unit 10*d* is pressed, the detection unit 63 detects this pressing, and thus second directional input P is processed.

Referring to FIG. 40, the movable input unit 10*c* and the press input unit 10*d* are connected to each other and moved as an integrated body. That is, when the movable input unit 10*c* is moved to a first direction indication location for first directional input M, the press input unit 10*d* is moved along with the movable input unit 10*c*. Therefore, regardless of the location of the movable input unit 10*c*, second directional input P using the press input unit 10*d* can be performed almost simultaneously with first directional input M.

At this time, pressing of the press input unit 10*d* may be detected by the detection means. The detection means may be implemented as switches (buttons) such as a membrane or a rubber dome, touch switches, touch sensors or optical sensors, as well as pressure sensors.

Figure 41:
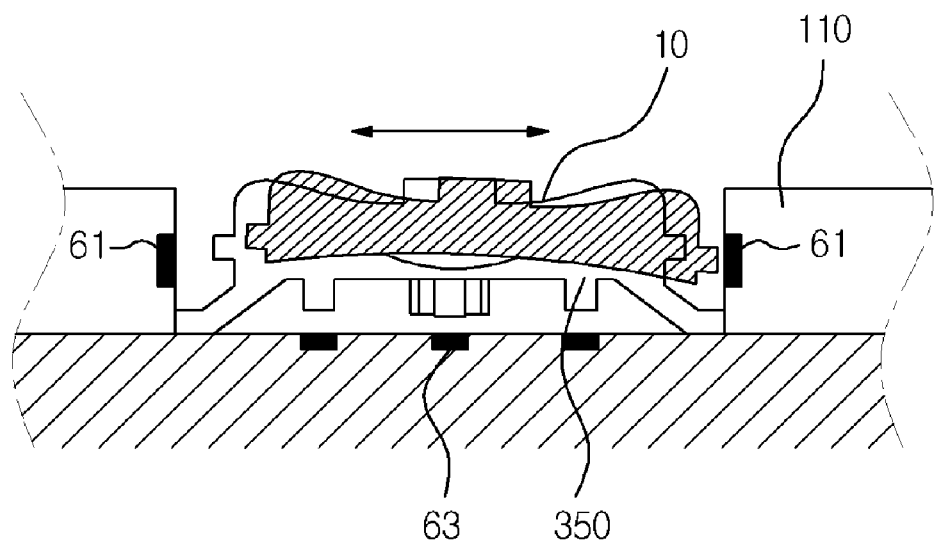

Meanwhile, in FIG. 41, another modification of the character input device according to the sixth embodiment is shown.

As shown in the drawing, in the modification, first directional input M is performed in such a way that the input unit 10 comes into contact with detection units 61 provided on the base 110 while being moved in a lateral direction. Further, second directional input P is performed in such a way that a direction press input unit 350 provided below the input unit 10 presses detection units 63 by pressing the second direction indication locations of the input unit 10.

According to the above sixth embodiment and modifications, the character input device has a structure in which second directional input P can be immediately performed even in the state in which the movable input unit 10*c* is tilted downwards, as shown in FIGS. 37 to 39, or in which the movable input unit 10*c* or the input unit 10 is moved in a lateral direction, as shown in FIGS. 40 and 41, for the purpose of first directional input M. That is, second directional input P can be performed in the state in which first directional input M has been performed, and thus first directional input M and second directional input P can be simultaneously operated.

Figure 54:
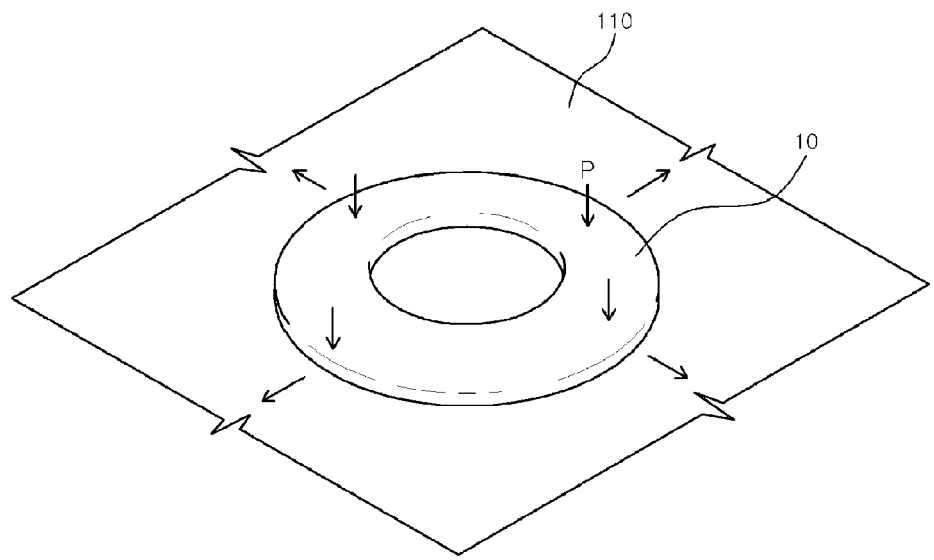
FIGS. 54 to 62 are views showing input units according to other embodiments of the present invention.

FIG. 54 illustrates a further modification of the character input device according to the sixth embodiment.

As shown in the drawing, an input unit 10 in the present modification is configured such that it has a through center portion and such that first directional input M is performed by moving the entire input unit 10 toward first radially arranged direction indication locations, and second directional input P is performed by pressing second direction indication locations arranged radially on the input unit 10. In this case, first directional input M may be configured to detect the movement of the input unit 10 through a structure in which a detection means is provided on the base 110 on which the input unit 10 is installed, or is provided on the side portion of the base 110 radially spaced apart from the input unit 10.

Figure 55:
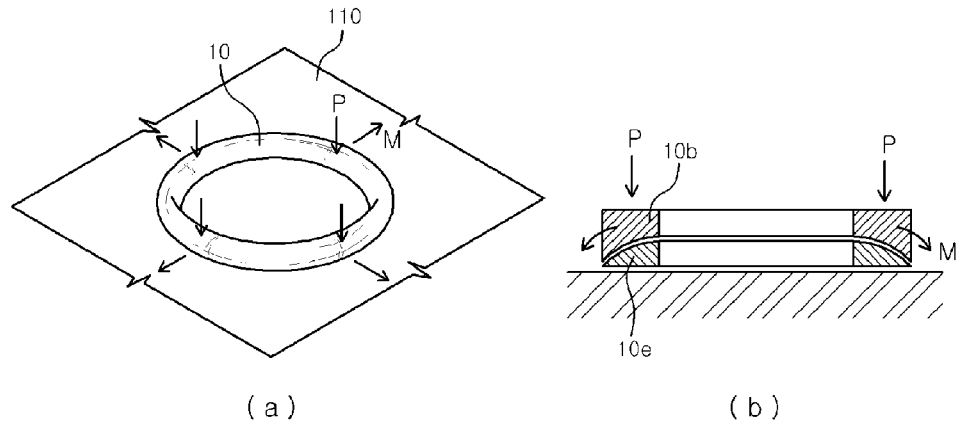

FIG. 55 illustrates yet another modification of the character input device according to the sixth embodiment.

As shown in the drawing, the input unit 10 in the present modification is formed in the shape of a ring. Such a ring-shaped input unit 10 may perform first directional input M by the movement of the entire input unit 10, and perform second directional input P by the pressing of second direction indication locations on the input unit 10, as shown in FIG. 55(*a*).

Figure 56:
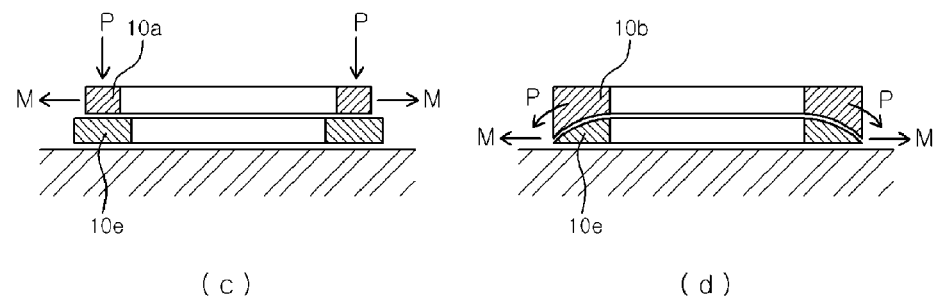

The input unit 10 may be implemented in detail, as shown in FIG. 56. In this case, first directional input M may be detected by first detection units (not shown) provided on the base 110 itself or on the sidewall of the base 110, and second directional input P may be detected by second detection units 63 provided below the input unit 10.

Further, as shown in FIG. 55(*b*), the input unit 10 is divided into a support portion 10*e* and a tilt portion 10*b*, so that first directional input M may be performed by tilting the tilt portion 10*b* downwards to the direction of the first radially arranged direction indication locations, and second directional input P may be performed by pressing second direction indication locations on the tilt portion 10*b*.

Further, as shown in FIG. 55(*c*), the input unit 10 is divided into a support portion 10*e* and a press unit 10*a*, so that first directional input M may be performed by moving the press unit 10*a* to the first direction indication locations and second directional input P may be performed by pressing second direction indication locations on the press unit 10*a*.

Furthermore, as shown in FIG. 55(*d*), first directional input M may be performed by moving the support portion 10*e* to first direction indication locations, and second directional input P may be performed by tilting the tilt portion 10*b* downwards to the direction of second radially arranged direction indication locations.

Figure 57:
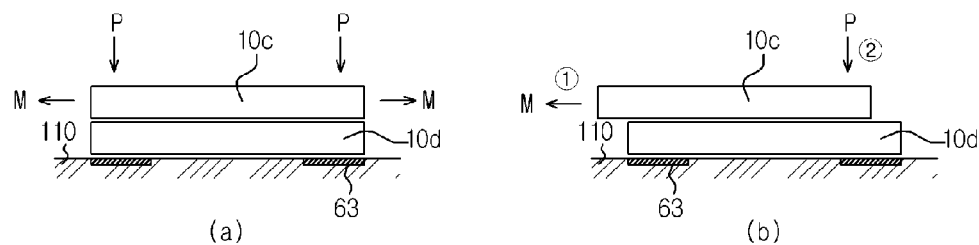

FIG. 57 illustrates still another modification of the character input device according to the sixth embodiment.

As shown in FIG. 57(*a*), first directional input M is performed by a movable input unit 10*c* and second directional input P is performed by a press input unit 10*d*. In this case, the movable input unit 10*c* is arranged to be stacked on the top of the press input unit 10*d*.

In this state, first directional input M is performed by moving the movable input unit 10*c* to first direction indication locations. When the movable input unit 10*c* is moved, the press input unit 10*d* is maintained in its original position.

Therefore, as shown in FIG. 57(*b*), when a second direction indication location is pressed (②) in the state in which first directional input M has been performed using the movable input unit 10*c* (①), the movable input unit 10*c* presses the press input unit 10*d*, and thus the pressing of the press input unit 10*d* is detected by second detection units 63.

In contrast, the movable input unit 10*c* is moved to a first direction indication location (②) in the state in which second directional input P has been performed using the press input unit 10*d* (①), and thus first directional input M is subsequently performed.

Figure 58:
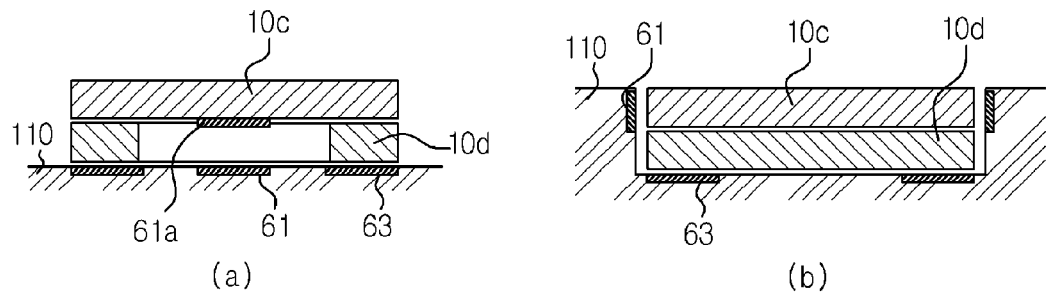

The movable input unit 10*c* and the press input unit 10*d* may be implemented in detail, as shown in FIG. 58. That is, as shown in FIG. 58(*a*), the press input unit 10*d* has a through center portion, and the first detection unit 61 is installed on the base 110 corresponding to the through center portion of the press input unit 10*d* and configured to detect first directional input M using the movable input unit 10*c*.

Here, the first detection unit 61 may be implemented as a hall sensor or an optical sensor. In this case, a magnet capable of generating a magnetic field to correspond to the hall sensor or an element 61*a* such as a light source capable of emitting light to correspond to the optical sensor may be mounted on the bottom of the movable input unit. Furthermore, the first detection unit 61 may be a contact terminal. In this case, the input unit may be configured such that a protrusion protrudes downwards from the bottom of the movable input unit and comes into contact with the contact terminal, thus enabling the movement of the movable input unit to be detected by the contact terminal.

Meanwhile, as shown in FIG. 58(*b*), the character input device may be configured such that first detection units 61 are mounted on the sidewalls of the base 110, and the movable input unit 10*c* comes into contact with the first detection units 61 when being moved, thus enabling the first detection units 61 to detect the first directional input M of the movable input unit 10*c*.

Figure 59:
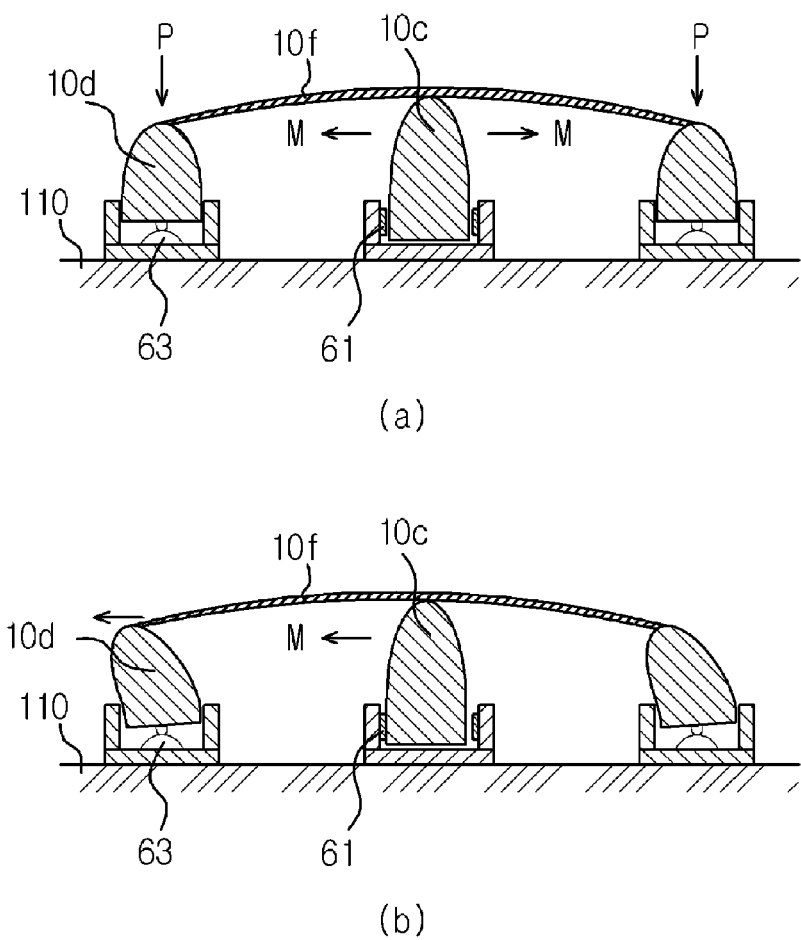

FIG. 59 illustrates still another modification of the character input device according to the sixth embodiment.

As shown in the drawing, a movable input unit 10*c* is provided at a reference location, and first directional input M is performed by moving the movable input unit 10*c* to one of a plurality of first direction indication locations arranged radially around the reference location and spaced apart from one another.

Further, press input units 10*d* are provided at respective second direction indication locations arranged radially around the reference location and spaced apart from one another, and second directional input P is performed at a selected one of the second direction indication locations by pressing a corresponding press input unit 10*d*.

Further, a first detection unit 61 is provided at the first direction indication locations around the movable input unit 10*c* and configured to detect the movement of the movable input unit 10*c*. Further, second detection units 63 are provided below the press input units 10*d* and configured to detect the pressing of the press input units 10*d*.

At this time, a film-shaped associative input unit 10*f* is installed on both the movable input unit 10*c* and the press input units 10*d*. The associative input unit 10*f* is formed in the shape of a thick film to enable first directional input M to be performed in such a way that the movable input unit 10*c* is moved along with the press input units 10*d* by the movement or tilting of the press input units 10*d*.

Therefore, in the present modification, first directional input M can be performed, not only, by moving the movable input unit 10*c* to first direction indication locations, but also, by moving or tilting the press input units 10d to a direction corresponding to the first direction indication locations and consequently moving the movable input unit 10c connected to the associative input unit 10f. Therefore, in the present modification, it is possible to successively perform second directional input P using the press input units 10d and first directional input M using the movable input unit 10c.

Figure 60:
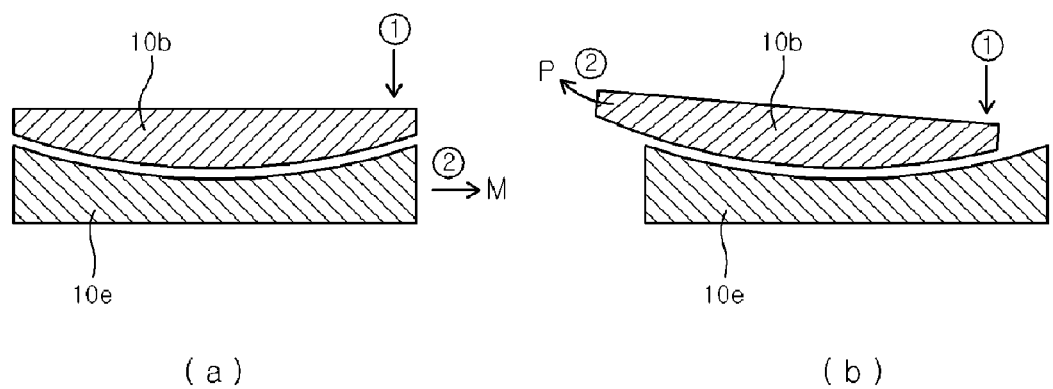

FIG. 60 illustrates still another modification of the character input device according to the sixth embodiment.

As shown in the drawing, the input unit 10 according to the present invention includes a plate-shaped support portion 10e and a tilt portion 10b corresponding to the plate shape. As the finger is radially moved outwards from the tilt portion 10b in the state in which the tilt portion 10b comes into contact with a first direction indication location (① of FIG. 60(a)), the support portion 10e and the tilt portion 10b are simultaneously moved (② of FIG. 60(a)), so that first directional input M is performed by this movement.

Further, as the second direction indication location of the tilt portion 10b is pressed (① of FIG. 60(b)), the tilt portion 10b is tilted downwards while being radially moved inwards along the plate shape of the support portion 10e (② of FIG. 60(b)), so that second directional input P is performed by this tilting.

At this time, first direction indication locations and second direction indication locations may be identical to each other. As described above, input for first direction indication locations and input for second direction indication locations are discriminated from each other depending on whether current movement is the movement of the support portion 10e or the tilting movement of the tilt portion 10b.

Figure 61:
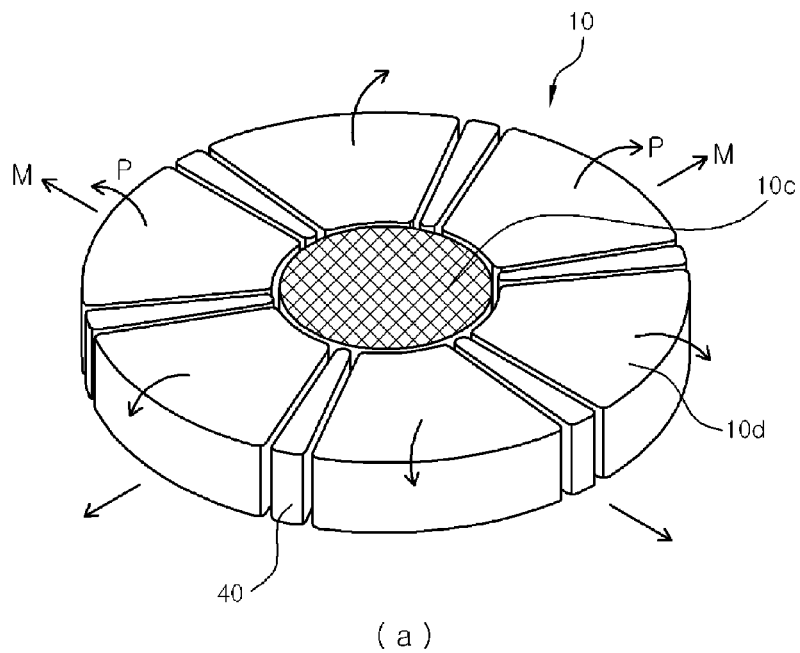
Figure 61:
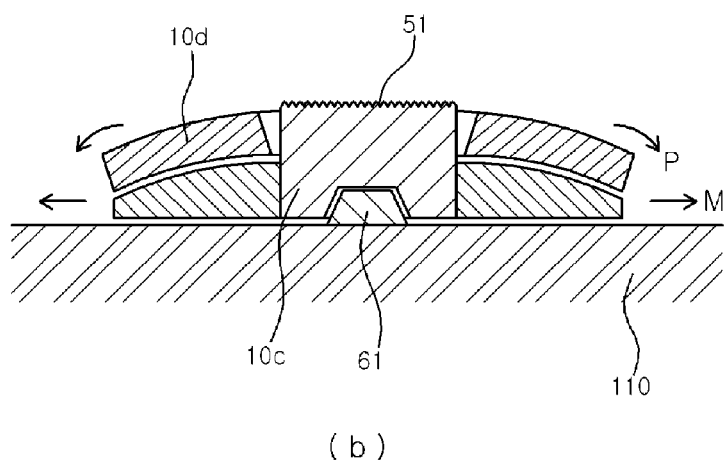

FIG. 61 illustrates still another modification of the character input device according to the sixth embodiment.

As shown in the drawing, in the present modification, the input unit 10 is provided to be divided into a movable input unit 10c, press input units 10d and guide units 40. The movable input unit 10c is arranged at the center portion of the input unit 10, and first directional input M is performed in such a way that the entire input unit 10 is moved along with the movement of the movable input unit 10c. The movement of the movable input unit 10c is detected by the detection unit 61 provided on the base 110 as the bottom of the movable input unit 10c comes into contact with the detection unit, thus enabling input to be performed at a relevant first direction indication location.

In this case, on the movable input unit 10c, a non-slip member 51 is formed, thus preventing the finger from slipping when the movable input unit 10c is moved to the first radially arranged direction indication locations.

Further, the press input units 10d are arranged around the movable input unit 10c, and second directional input P is performed by pressing the press input units 10d. In this case, guide units 40 for preventing adjacent press input units 10d from being pressed simultaneously with a desired press input unit 10d are provided between respective neighboring press input units 10d.

Figure 62:
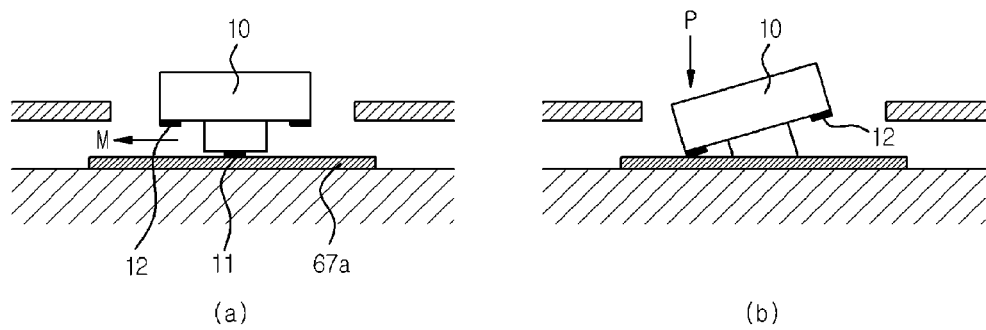

FIG. 62 illustrates a seventh embodiment of a character input device according to the present invention.

That is, in FIG. 62(a), a first contact point 11 provided on the bottom of the input unit 10 is provided to come into contact with a touch pad 67a placed on the surface and to recognize a signal for first directional input M based on directional movement. In FIG. 62(b), in the case where the directional pressing of the input unit 10 is performed, when a second contact point 12 comes into contact with the touch pad 67a on the basis of the first contact point 11, the location of the second contact point 12 is detected, and thus a signal for second directional input P is recognized.

The present invention is configured to perform movement (or pressing) by sensing pressure even if movement (or pressing) is not performed in actual space. First directional input M based on directional movement and second directional input P based on directional pressing are preferably implemented to be performed in four or more directions.

In each of the above embodiments, first directional input M and second directional input P may have the same number or different numbers of direction indication locations.

Further, at least one of first directional input M and second directional input P may be provided to be performed in multiple steps.

For example, first directional input M may be provided as one-step input, and second directional input P may be provided as two-step input. In this case, through second directional input P, consonants may be input, and through first directional input P, vowels may be input.

The reason for this is that the number and use frequency of consonants are relatively greater than those of vowels in the characters of most countries, and that, at the time of performing multi-step input, second directional input P may be relatively easier than first directional input M.

As described above, the character input device 1 according to the present invention is capable of promptly and accurately inputting characters by combining first directional input M and second directional input P having different input actions.

The reason for this is that, at the time of inputting characters of respective countries in which consonants and vowels are repeatedly mixed and arranged, consonants and vowels can be input differently depending on respective input actions.

Furthermore, since first directional input M and second directional input P do not have constraints between their respective input actions (that is, such as by essentially performing one input action to perform another input action), a plurality of input actions is successively performed, and thus the respective input actions may be performed like one input action.

With reference to FIG. 26, an example of input performed using the character input device 1 according to the present invention will be described below. When the 'CAR' letters of the English alphabet are intended to be input, the input unit 10 is tilted downwards (or a press part 11 is selected) to the direction of a second direction indication location P7 to which a consonant 'C' is assigned. Thereafter, the input unit 10 is moved to a first direction indication location M1 to which a vowel 'A' is assigned. Next, the input unit 10 needs to be tilted downwards to the direction of a second direction indication location P2 to which a consonant 'R' is assigned. Since the above three actions may be performed almost simultaneously or sequentially with slight delays, a word composed of several letters may be input as if several letters were being input through a single continuous action.

Figure 42:
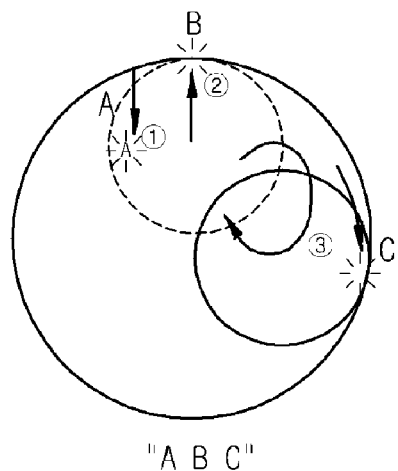
FIGS. 42 to 44 are views showing operations according to various embodiments of the present invention.
Figure 43:
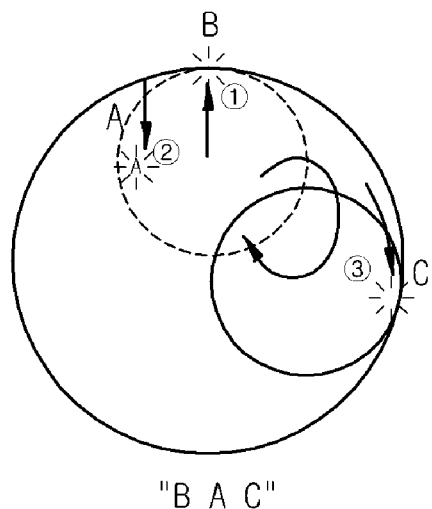
Figure 44:
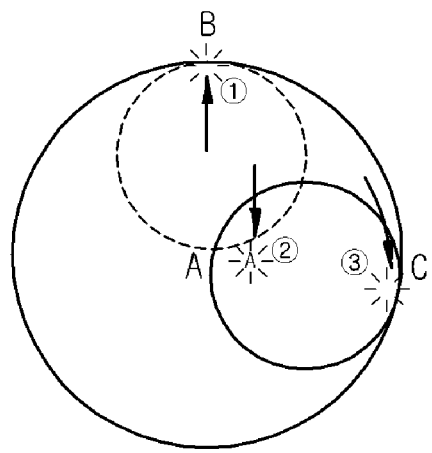

FIGS. 42 to 44 are diagrams showing other examples of input performed using the character input device according to the present invention.

FIG. 42 illustrates an example in which a user performs directional pressing input toward a predetermined second direction indication location (①), performs directional movement toward a predetermined first direction indication location $M_1$ (②), moves to a first direction indication location $M_3$ in a circumferential direction (③), and then returns to a reference location S.

Through the above operation, "A B C" are input. The first directional input and the second directional input are almost simultaneously performed. In this example, second directional input was performed slightly earlier with a little difference.

Further, FIG. 43 illustrates an example in which a user moves the input unit toward the first direction indication location $M_1$, tilts the input unit downwards to the direction of a second direction indication location $P_6$ at that position, moves the input unit to a first direction indication location $M_3$ in a circumferential direction, and then returns to the reference location S. Through the operation, "B A C" are input. In this example, the first directional input is performed slightly earlier than the second directional input with a little difference.

Meanwhile, FIG. 44 illustrates an example of the action in which a user moves the input unit to a first direction indication location $M_1$, moves the input unit to a first direction indication location $M_3$ in a circumferential direction, tilts the input unit downwards to the direction of a second direction indication location $P_6$ at that position, and then returns to the reference location S. Through this action, "B C A" are input.

Here, the above three actions may be performed as slightly different successive actions, without being separately performed, thus enabling a word composed of several letters to be input as if the letters had been input through one continuous action.

The above embodiments represent basic forms in which first directional input M and second directional input P are combined with each other in the character input device 1 according to the present invention. In addition, it is apparent that combinations of various components are possible, and modifications of the components in shapes, sizes, and materials are also possible without being restricted.

Hereinafter, additional components that may be included in the above-described basic forms and various modifications will be described in detail.

It should be noted that the respective components which will be described later may be independently applied, and two or more components may be applied together and various combinations are possible in this case.

Central Input C

In the present specification, the term 'central input C' means an action performed in such a way that a central input key 13 provided at the center of an input unit 10 is selected, separately from first directional input M or second directional input P, or that the input unit 10 itself is lifted or lowered.

Central input C may be performed by, for example, the central input key 13 that can be selected at the center of the input unit 10, and a third detection unit 65 that detects the selection of the central input key 13, as shown in FIG. 3.

Alternatively, the central input C may be performed by both a structure in which the entire input unit 10 is provided to be movable vertically relative to the base 110, and the third detection unit 65, which is provided on the input unit 10 or the base 110 to detect the vertical movement of the input unit 10, as shown in FIG. 4(d).

Here, it is apparent that either or both of the two types of central input C may be provided.

Meanwhile, it is apparent that the central input C may be performed in two or more steps, that is, in multiple steps, depending on the distance of pressing of the central input key 13, the intensity of pressing, or the distance the input unit 10 itself ascends and descends.

Meanwhile, the central input key 13 may be configured to perform touch input in which other characters assigned together to the central input key 13 are input by detecting approach to or contact with the central input key 13.

In this case, a central input key detection unit 69 for detecting approach or contact of the finger is provided on the central input key 13.

When the central input key detection unit 69 is provided, the control unit 51 may ignore the results of the detection by touch detection units 67 and prevent touch input from being performed when the contact of the finger is detected by the central input key detection unit 69 for a predetermined period of time or longer.

Combined Central Input CM and CP

In the present specification, the term 'combined central input CM and CP' means an action in which central input C is performed simultaneously with one of first directional input M and second directional input P.

For example, combined central input denotes an action of moving the input unit 10 toward a predetermined one of first direction indication locations $M_1$, $M_2$, . . . in the state in which the central input key 13 of FIG. 3 is pressed, at the time of performing first directional input M, as shown in FIG. 4(b), or an action of tilting the input unit 10 downwards to the direction of a predetermined one of second direction indication locations $P_1$, $P_2$, . . . in the state in which the central input key 13 is pressed, at the time of performing second directional input P, as shown in FIG. 4(c).

Figure 12:
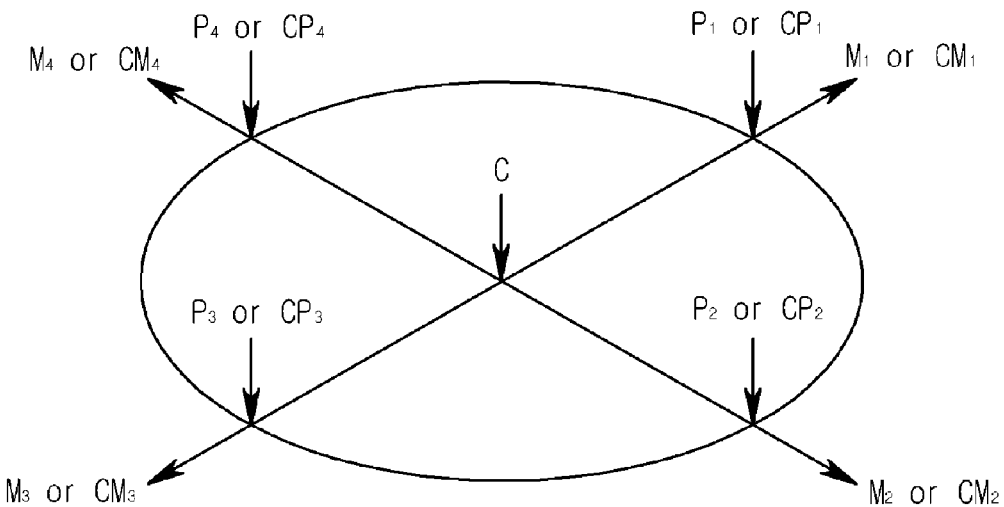
FIG. 12 is a conceptual diagram showing combined central input according to the present invention.

FIG. 12 is a conceptual diagram showing a method of performing combined central input CM and CP.

An example of the combination of first directional input M and central input C is described with reference to the drawing. During a procedure in which the input unit 10 is being moved to a predetermined first direction indication location $M_1$, when the input unit 10 is moved in the state in which central input C has been performed, combined directional input $CM_1$ is performed, whereas, when the input unit 10 alone is moved without the performance of central input C, first directional input $M_1$ is performed.

Here, combined central input CM and CP may also be applied to the case where one or more of first directional input M, second directional input P and central input C are performed in two or more steps, that is, in multiple steps.

Figure 17:
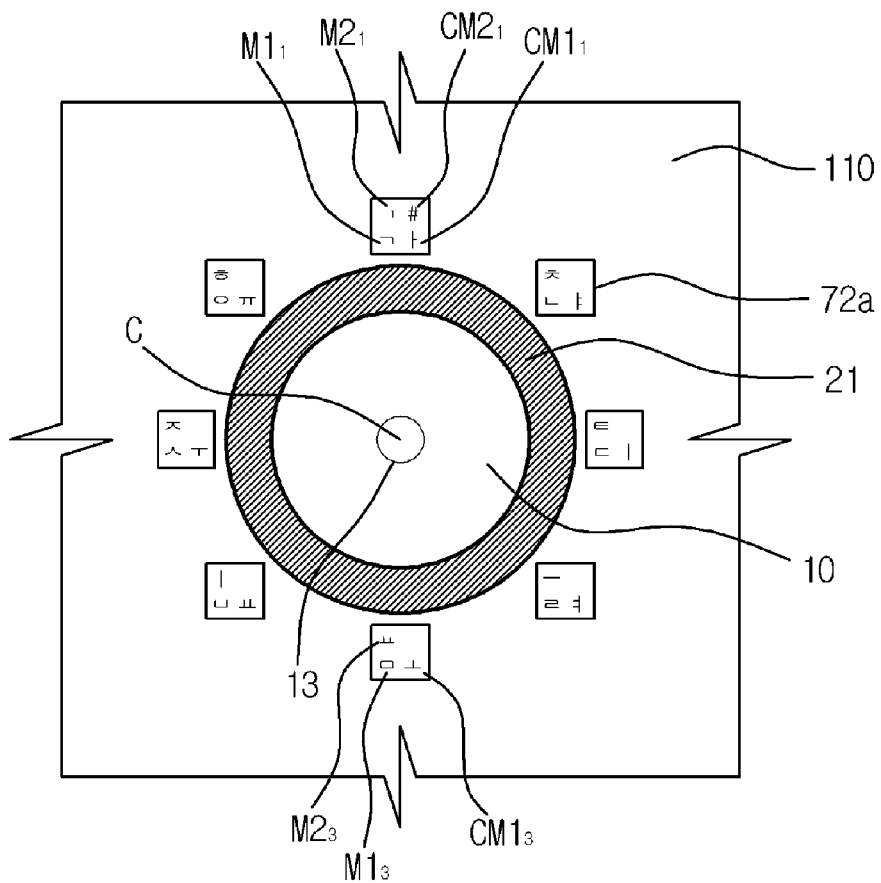

For example, as shown in FIG. 17, when first directional input M is provided in two steps, it is possible to implement first-step combined central input $CM1_1$ in which first-step first directional input $M1_1$ is combined with central input C, and second-step combined central input $CM2_2$ in which second-step first directional input $M2_1$ is combined with central input C.

Figure 18:
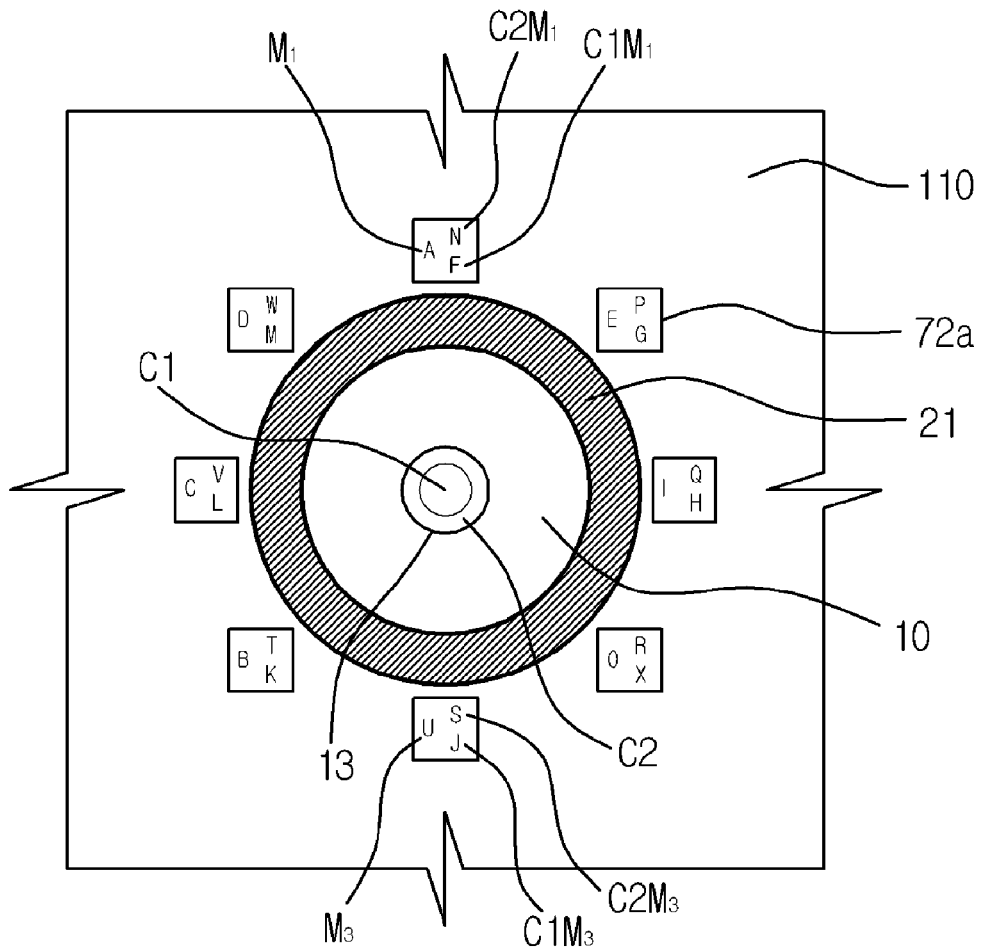

In contrast, as shown in FIG. 18, first directional input M is implemented in one step and central input C1 and C2 are implemented in two steps, so that it is possible to implement first-step combined central input $C1M_1$ in which first directional input $M_1$ is combined with first-step central input C1, and a second-step combined central input $C2M_1$ in which second directional input $M_1$ is combined with second-step central input C2.

Therefore, when the character input device is configured to perform combined central input CM and CP, several characters may be assigned to each of first direction indication locations $M_1$, $M_2$, . . . and second direction indication locations $P_1$, $P_2$, . . . , so that input capacity (the number of characters that can be input) can be increased without requiring additional components.

In the above two cases, it is apparent that combined central input CM and CP can also be performed through the combination with second directional input P in addition to combination with first directional input M.

That is, combined central input CM and CP can be performed through the combination of all types of first directional input M and second directional input P with all types of central input C without limitation.

Through such combined input, numbers or symbols can be input together with characters at the time of inputting text. That is, in typical portable devices, the arrangement of keys is limited, so that numbers, symbols or the like are input through repeated mode switching in general cases, thus increasing the number of input actions and decreasing input speed.

However, the character input device according to the present invention enables a number or a symbol to be more easily and rapidly input using one action through combined input of central input C and first directional input M or second directional input P. By way of this combined input, input capacity can be increased twice.

Detailed examples of the above-described combined central input CM and CP will be described with reference to FIGS. 45 and 46.

Figure 45:
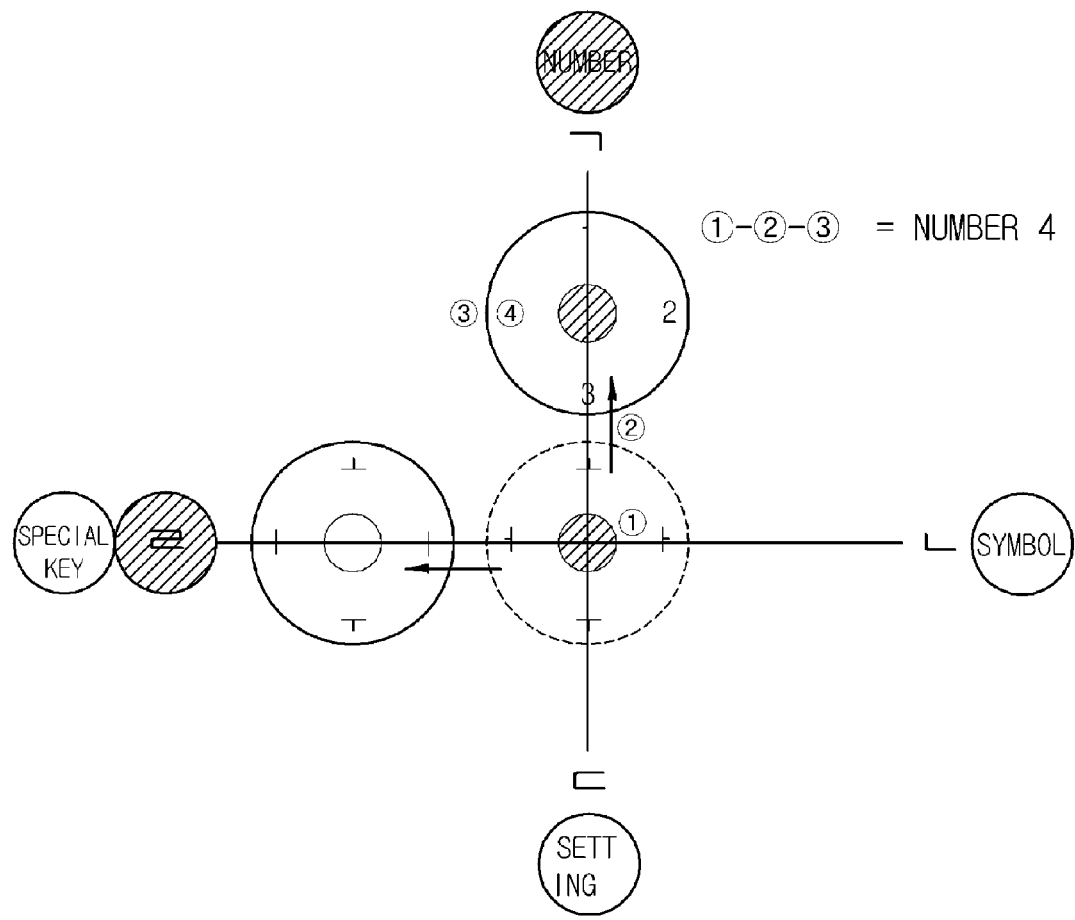
FIGS. 45 to 50 are views showing input methods according to various embodiments of the present invention.

FIG. 45 is a diagram showing the implementation of combined input of central input C, first directional input M (directional movement input) and second directional input P (directional pressing input). Referring to the drawing, letters such as 'ㄱ', 'ㄴ', 'ㄷ' and 'ㄹ' are assigned to respective directions corresponding to first direction indication locations, and letters such as 'ㅏ', 'ㅓ', 'ㅗ' and 'ㅜ' are assigned to respective directions corresponding to second direction indication locations.

When first directional input is performed in such a way that the input unit 10 is moved in the direction of 9 o'clock, the letter 'ㄹ' arranged in a first direction indication location corresponding to the direction is input. However, when the input unit is moved in the direction of 12 o'clock (②) while central input (①) is performed, a 'number mode' assigned to the location corresponding to the direction of 12 o'clock is activated, and then numbers '1', '2', '3' and '4' instead of 'ㅏ', 'ㅓ', 'ㅗ' and 'ㅜ' are assigned to a direction pressing plate. Then, when second directional input is performed by pressing the input unit in the direction of 9 o'clock, a number '4' is input.

Figure 46:
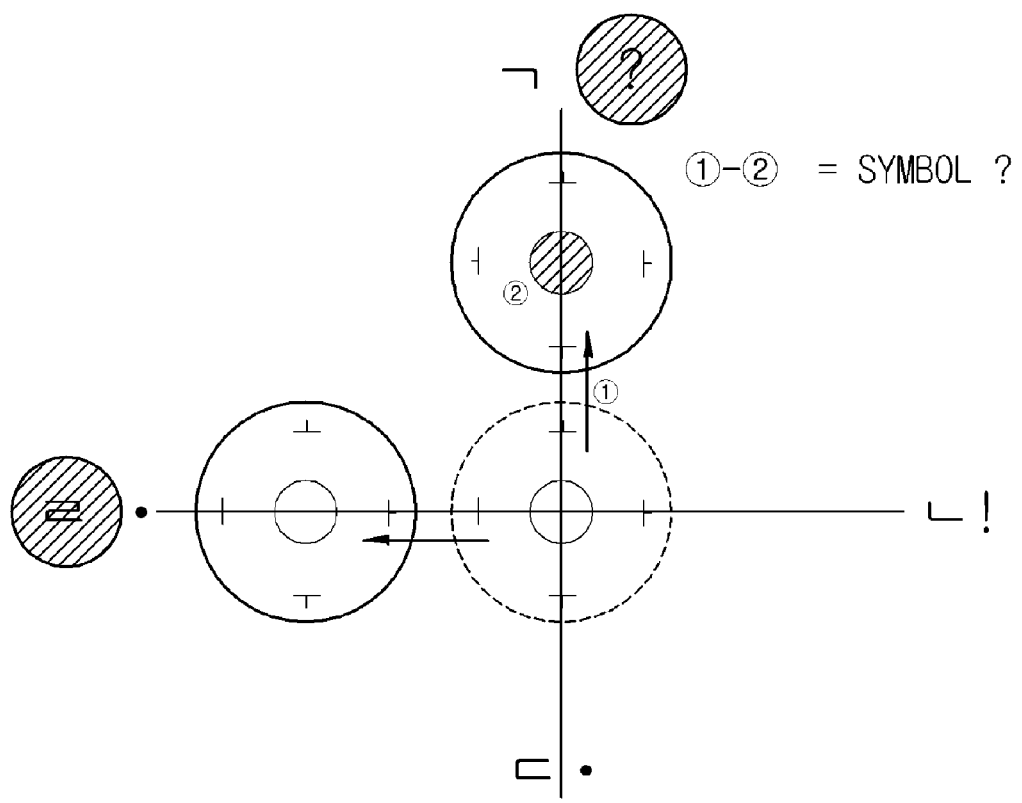

Referring to FIG. 46, FIG. 46 shows that, when central input is performed after directional movement input has been performed, a character other than the character assigned to the directional movement input is input. For example, when only directional movement input is performed in the direction of 12 o'clock, 'ㄱ' is input, but, when central input is performed after directional movement has been input, a symbol '?' is input.

Combined Directional Input MP and PM

In the present specification, the term 'combined directional input MP and PM' means that, when, in the state in which any one of first directional input M and second directional input P has been primarily performed, the other is subsequently performed, a third character assigned to such an input action is input.

That is, combined directional input MP and PM denotes an action of performing second directional input P, as shown in FIG. 4(c), in the state in which first directional input M has been primarily performed, as shown in FIG. 4(b), that is, in the state in which the input unit 10 has been moved to a first direction indication location M, or vice versa.

Figure 13:
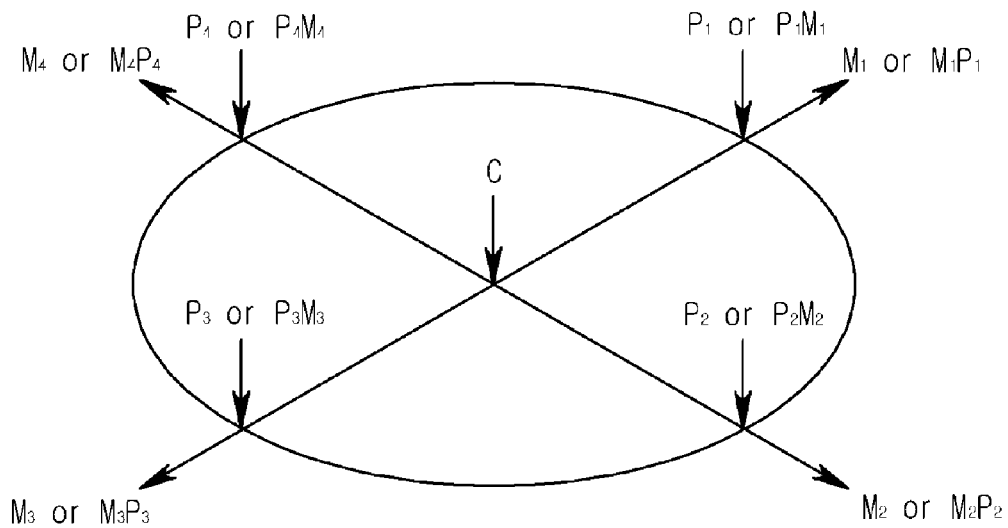
FIG. 13 illustrates a conceptual diagram of combined directional input and a plan view of an input unit according to the present invention.

FIG. 13 is a conceptual diagram showing a method of performing combined directional input MP and PM.

Referring to the drawing, combined directional input $M1P_1$ shows the case where second directional input P is performed at a second direction indication location $P_1$ in the state in which the input unit 10 has been moved to a first direction indication location $M_1$.

In contrast, combined directional input $P1M_1$ shows the case where first directional input M is performed at the first direction indication location $M_1$ in the state in which second directional input P has been performed at the second direction indication location $P_1$.

Of course, it is possible to perform input by differently setting the directions of first direction indication locations $M_1$, $M_2$, . . . and second direction indication locations $P_1$, $P_2$, . . . . For example, when second directional input P is performed at a second direction indication location P4 in the state in which the input unit 10 has been moved to a first direction indication location M2, combined directional input $M2P_4$ is performed.

As described above, in the case of combined directional input $M1P_1$ and $P1M_1$, different characters may be input according to the sequence of first directional input M and second directional input P which are combined with each other. Alternatively, the same character may be input regardless of the sequence of combination.

That is, the same character may be input through combined directional input $M1P_1$ and $P1M_1$.

Meanwhile, it is apparent that when the character input device is not configured to support combined directional input MP and PM, respective input actions are independently performed even if first directional input M and second directional input P are simultaneously performed.

That is, in the embodiment of FIG. 5, when second directional input P for inputting 'ㅗ' and first directional input M for inputting 'ㄴ' are simultaneously performed, a Korean alphabet letter 'ㅗ' is input by respective input actions, without a new combined character being input.

Figure 47:
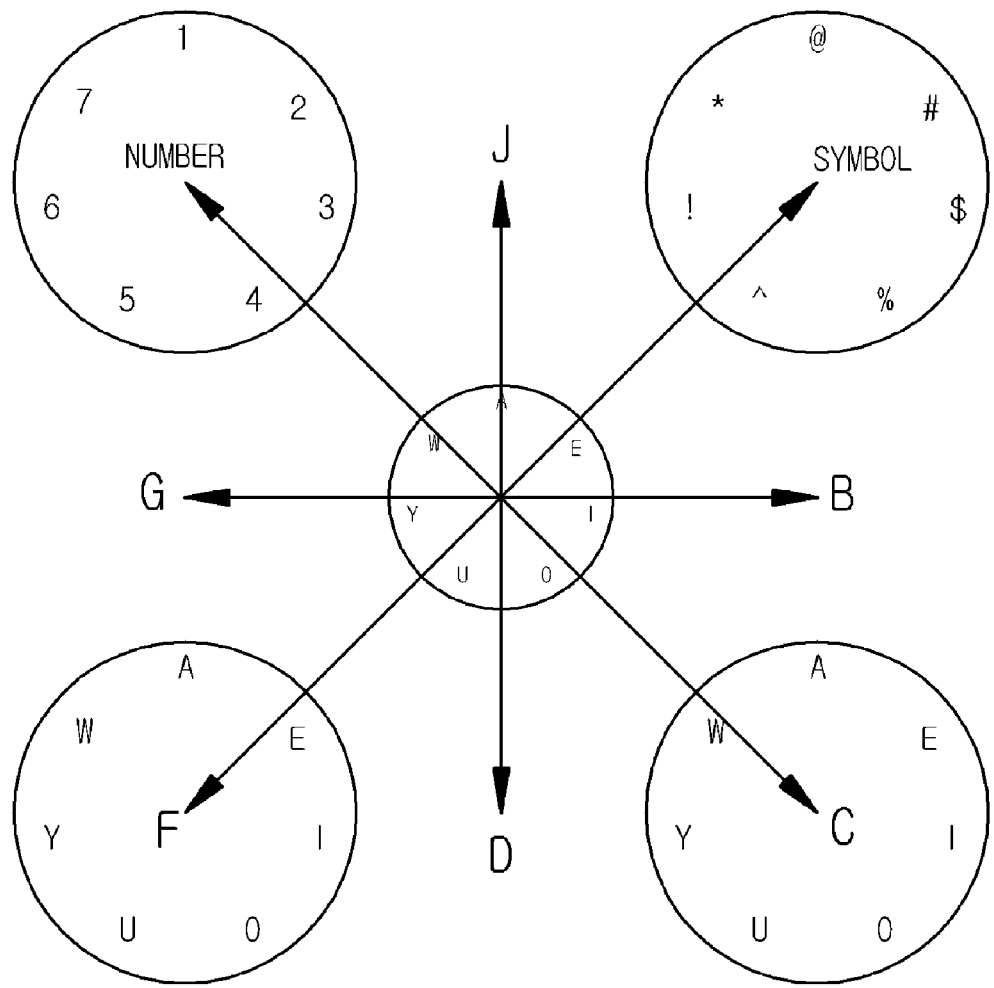

The above-described combined directional input MP and PM will be additionally described with reference to FIG. 47.

As shown in the drawing, when directional movement input is performed in a predetermined direction, a number or a symbol instead of a character can be input. That is, when first directional input M is performed in the direction of 5 or 7 o'clock, press parts can equally indicate character (consonant or vowel) plates. However, when first directional input M is performed in the direction of 1 or 11 o'clock, press parts are switched to symbol or number plates, and thus second directional input P may be performed for a symbol or a number.

Through the combination of first directional input M with second directional input P, an advantage of immediately inputting a number or a symbol without switching to symbol or number mode is realized by greatly increasing input capacity.

Here, it should be noted that the above central input C, combined central input CM and CP, and combined directional input MP and PM may be freely combined and used with the first directional input M and second directional input P according to the circumstances, and that, at the time of respective input actions, the number of respective direction indication locations and the determination of whether to perform input in multiple steps can be freely changed and used without restrictions.

In more detail, it is possible to perform all of central input C, first directional input M and second directional input P, thus enabling a new character code to be input. At this time, it is possible to perform input in the sequence of central input, first or second directional input, and first or second directional input, or in the sequence of first or second directional input, central input, and first or second directional input. Based on the series of these input actions, derivatives derived from a predetermined character, words, numbers or symbols can be extended and input.

Combined forms of central input C, combined central input CM and CP and combined directional input MP and PM are described in detail with reference to FIGS. 48 and 49.

Figure 48:
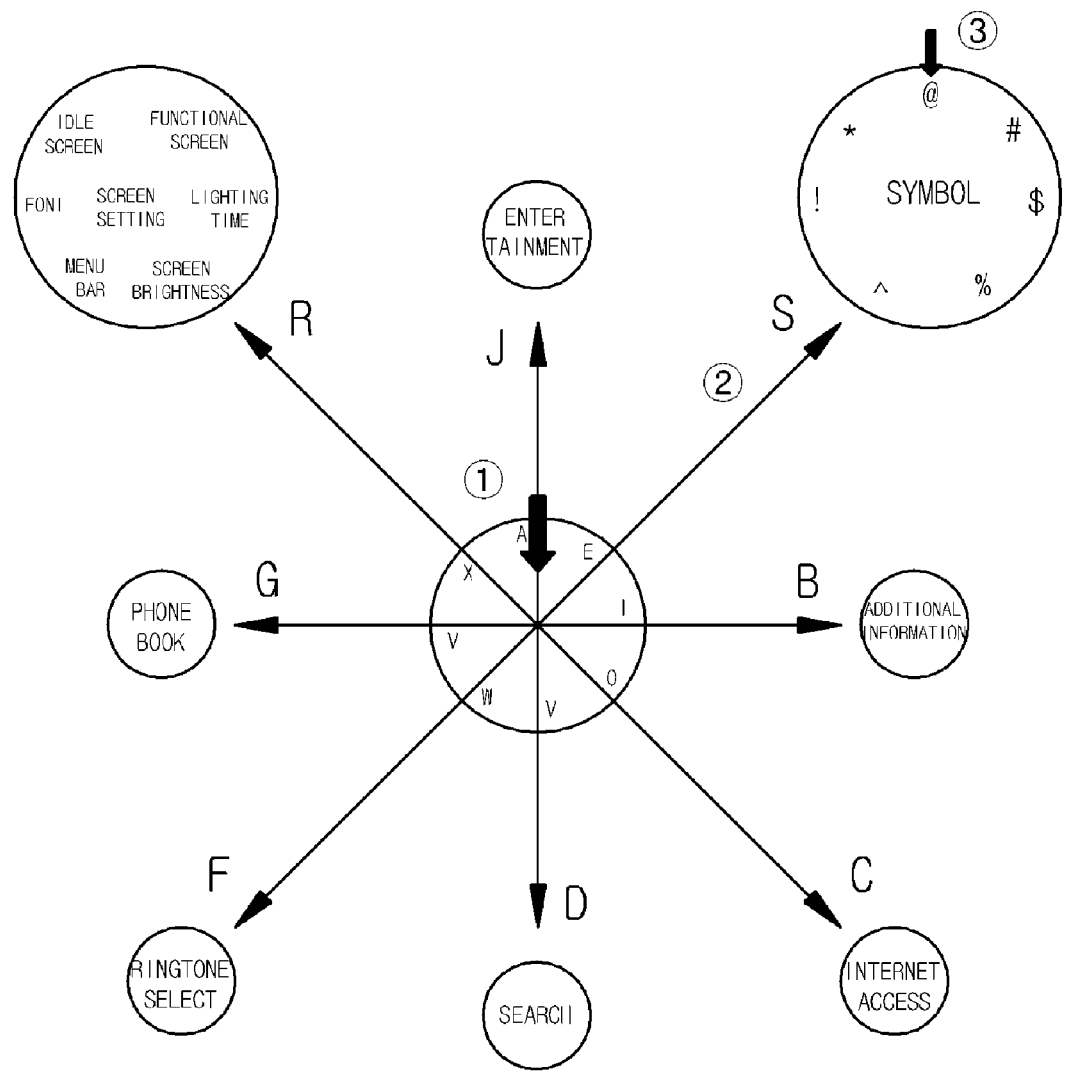

As shown in FIG. 48, when central input (①) is performed, instructions such as 'symbol', 'additional information', 'Internet access', and 'search' are arranged at second direction indication locations. In this case, when first directional input is performed in the direction in which 'symbol' is arranged (②) in the state in which central input has been performed, '@, #, $, %, . . . ' belonging to 'symbol' are newly arranged at the second direction indication locations. Accordingly, second directional input is performed (③) at the second direction indication location at which '@' is arranged so as to select '@' from among the above symbols, and thus '@' can be input.

In this way, it is also possible to set 'standby screen' or 'functional screen' included in the 'screen setting' shown in FIG. 48.

Further, through the combination of central input, first directional input and second directional input, it is possible to not only arrange all characters but also rapidly arrange the characters even when the number of characters exceeds 32 as in the case of Hiragana or Katakana of the Japanese language, or the Chinese language.

Figure 49:
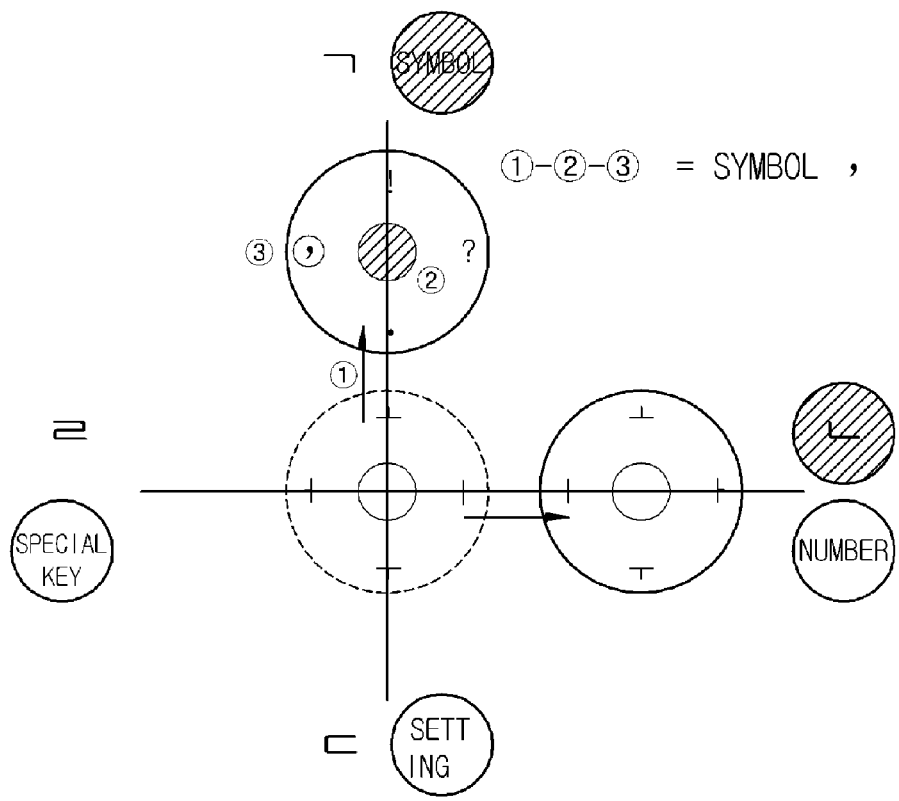

Further, FIG. 49 illustrates a combination of first or second directional input, central input and first or second directional input. For example, after first directional input has been performed using the input unit 10 in the direction of 12 o'clock, when central input is performed, and subsequently second directional input is performed in the direction of 9 o'clock, a symbol ',' is input.

Figure 50:
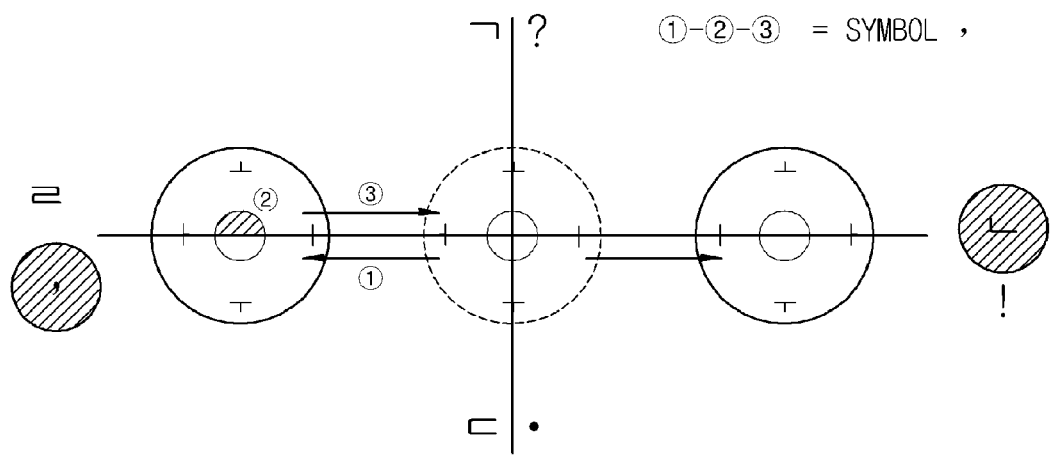

Meanwhile, FIG. 50 illustrates an example in which first directional input, central input and first directional input are combined with each other in multiple steps. That is, after first directional input is performed in the direction of 9 o'clock, when central input is performed, and subsequently first directional input for returning to a reference location is performed, a symbol ',' is performed.

In this case, second directional input instead of first directional input may be combined with central input, and first directional input and second directional input may be combined together with central input.

In other words, in signal combination, directional input is first directional input or second directional input. That is, in the above embodiments, a description has been made on the basis of first directional input, but the embodiments may be combined with second directional input.

Rotating Directional Input R

In the present specification, the term 'rotating directional input R' means that an assigned character or data is input while the input unit 10 itself is rotating on the base 110 around the reference location in each of right and left directions.

Figure 14:
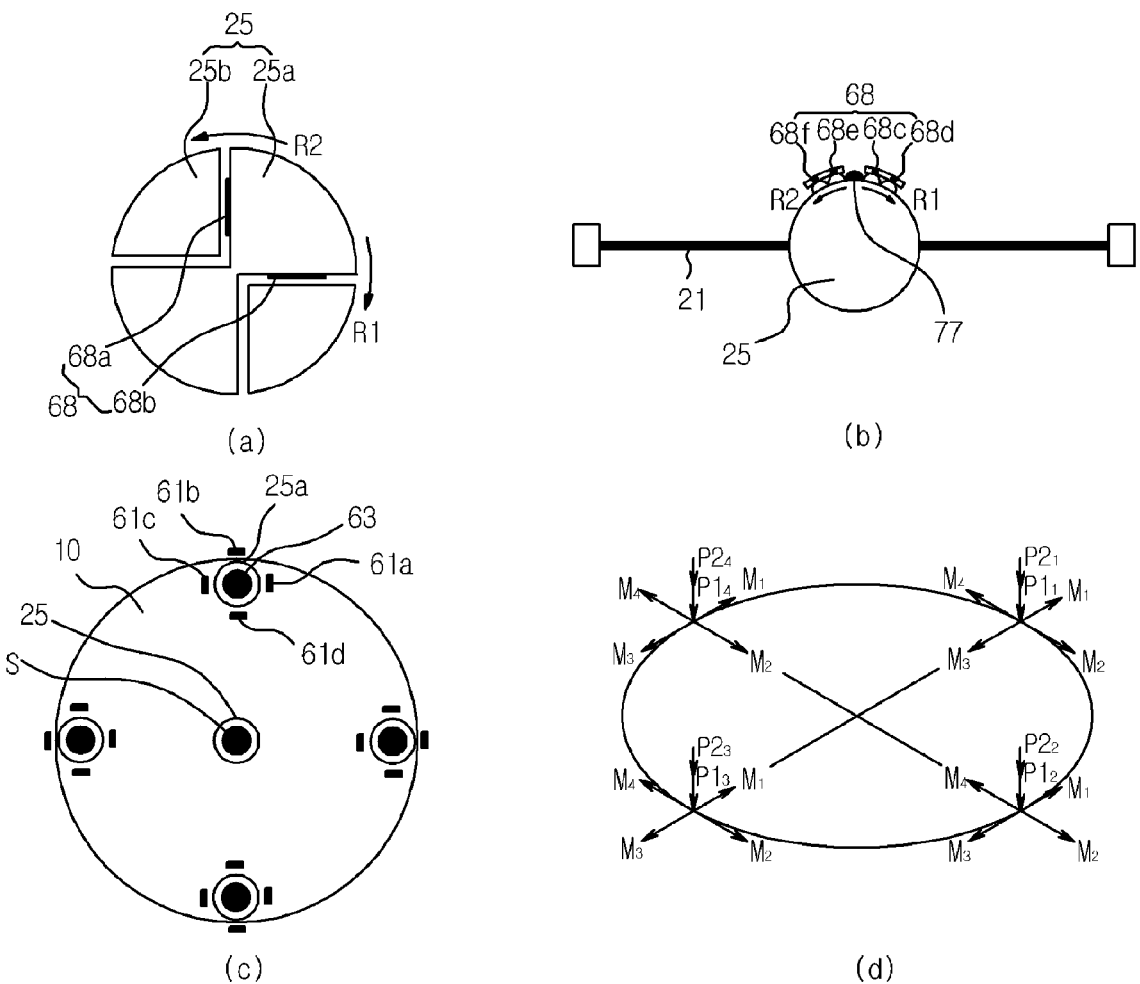
FIG. 14 is a plan view of a support unit showing rotating directional input according to the present invention.

The rotation of input unit 10 can be implemented using various methods. For example, as shown in FIG. 14(a), a support unit 25 may be provided to be divided into a first support unit 25a and second support units 25b capable of performing movement relative to each other.

Here, the first support unit 25a may be fixed and the second support units b may be rotated toward the first support unit 25a, or vice versa.

Rotation detection units 68a and 68b may be provided between the first support unit 25 and the second support units 25 in respective rotating directions.

Therefore, when the input unit 10 is rotated in a right direction R1, the first support unit 25a is rotated, and then the rotation detection unit 68b detects the rotation. When the input unit 10 is rotated in a left direction R2, the rotation detection unit 68a detects the rotation.

Further, as shown in FIG. 14(b), a rotating projection 77 may be formed on a portion of the input unit 10, and rotation detection units 68c, 68d, 68e and 68f sequentially arranged in the direction of the rotating distance of the rotating projection 77 may be provided to the left and right of the rotating projection 77.

The leftward and rightward rotations of the input unit 10 may be implemented as two-step rotation depending on a distance of rotation (or an angle of rotation). Therefore, when the input unit 10 is rotated to the right in one step, the rotation detection unit 68c may detect first-step rotation. When the input unit 10 is further rotated to the right and performs rotation in two steps, the second right rotation detection unit 68d may detect second-step rotation.

Arrangement of Characters

In the present specification, the term 'character' refers to a character in a narrow sense based on the languages of various countries, such as a Korean alphabet character, an English alphabet character or a Japanese character.

However, data that can be input using the character input device according to the present invention is not limited to the characters, and may include numbers, symbols and various types of function commands, such as Enter, space or Escape.

Further, in the present specification, the term 'vowel' refers to a character, the sound of which corresponds to a vowel of the Korean alphabet in the case of a foreign language, or a character that belongs to an alphabet group having a smaller number of characters when the alphabet of a foreign language is divided into two groups according to linguistic classification criteria.

In the character input device 1 of the present invention, there is no special limitation on a method of arranging characters in the above first directional input M, second directional input P, central input C, combined central input CM and CP or combined directional input MP and PM.

However, it is possible to arrange characters using the following method so as to more efficiently input characters.

First, at the time of arranging characters of respective countries, consonants and vowels may be input through different input actions, respectively.

For example, consonants may be input through first directional input M and vowels may be input through second directional input P, or vice versa.

This scheme is advantageous in that, since a user can associate respective characters with corresponding input actions, the user can be easily accustomed to the character input device 1 of the present invention.

FIG. 15 is a table showing an example of the arrangement of characters of respective countries in the above embodiment.

Referring to the drawing, consonants of characters of respective countries may be arranged in two-step first directional input M and vowels may be arranged in two-step second directional input P.

Basically, consonants and vowels are separately arranged at first direction indication locations $M_1, M_2, \ldots$ and second direction indication locations $P_1, P_2, \ldots$, respectively. However, it is apparent that consonants and vowels may be assigned to different direction indication locations according to the circumstances in such a way that, in the case of the Korean alphabet, vowels 'ㅐ and ㅔ' are arranged at the first direction indication locations $M_1, M_2, \ldots$, or in the case of the English alphabet, consonants 'V and Z' are assigned to the second direction indication locations $P_1, P_2, \ldots$.

In this case, function commands such as Enter, space, Back cursor, and Escape (ESC), as well as vowels, may be further assigned to the second direction indication locations $P_1$, $P_2$, . . . .

Further, with regard to the English alphabet, a series of characters having high use frequency, for example, 'CH', 'ING', etc. may be assigned to one direction indication location.

In this case, letters 'W, X and Y' other than vowels 'A, E, I, O and U' of the English alphabet have the same effect as that of vowels, and are then defined as a vowel part in the present specification.

Meanwhile, it is possible to assign a mode switch window to first-step central input C1 and a mouse mode switch function to second-step central input C2.

As shown in FIG. 16(a), in the case where four second direction indication locations $P_1$, $P_2$, . . . are provided, and second directional input P is provided to be performed in two steps, it is possible to assign 'A, X', 'E, I', 'W, Y', and 'O, U' to the second direction indication locations $P_1$, $P_2$, . . . , respectively, and to discriminatively input respective letters, assigned together to each location, through first-step and second-step second directional input P when letters of the English alphabet are arranged.

That is, through first-step second directional input P, 'E ($P1_2$)' may be input, and through second-step second directional input P, 'I($P2_2$)' may be input.

Further, when letters of the Korean alphabet are arranged, 'ㅏ, ㅑ', 'ㅓ, ㅕ', 'ㅗ, ㅛ', and 'ㅜ, ㅠ' may be assigned to locations for second directional input P, so that the respective letters assigned to each location may be discriminatively input through first-step and second-step second directional input, as shown in FIG. 16(b).

Figure 16:
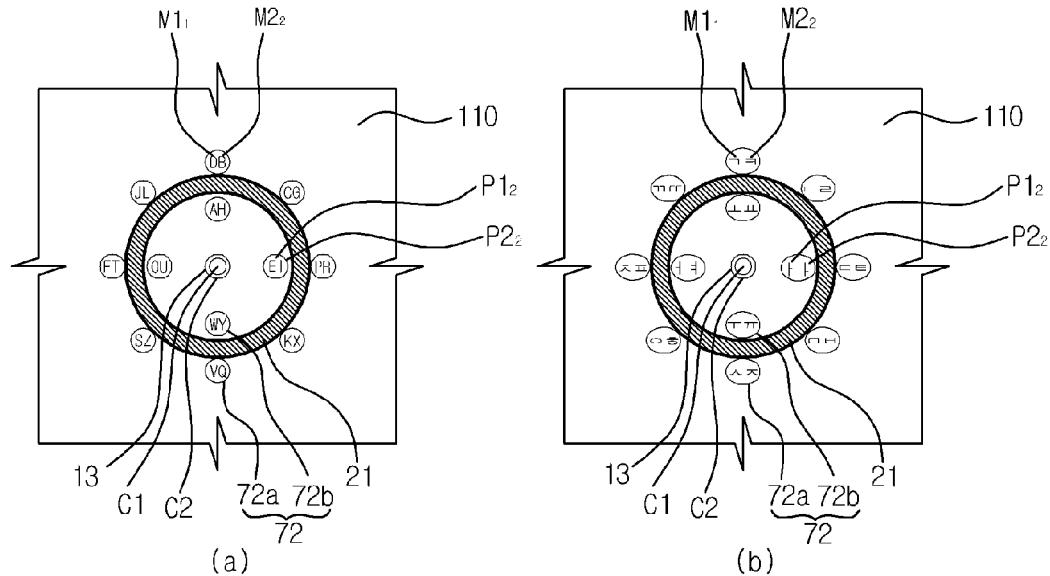
FIGS. 16 to 18 are diagrams showing principal parts of a character input device according to various embodiments of the present invention.

Of course, in contrast with FIG. 16, it is possible to provide first directional input M in two steps using four first direction indication locations $M_1$, $M_2$, . . . , thus enabling vowels to be input through first directional input M.

As described above, when characters having a similar shape are arranged as a group as in the cases of the English and Korean alphabets, the shapes of vowels are associated with second direction indication locations $P_1$, $P_2$, . . . , so that the user can be easily accustomed to this character input device.

In particular, in the case of the Korean alphabet, when vowels are arranged in directions of the east (ㅏ), the west (ㅓ), the south (ㅜ) and the north (ㅗ), as described above, the shapes of vowels may be associated with respective directions, so that the user can be easily accustomed to this character input device.

Further, in the arrangement of English alphabet letters, letters having a similar shape may be grouped and arranged.

For example, two different letters are assigned to each direction indication location, as in the case of 'b, d', 'p, q', 'i, j', 'm, w', 'u, v', 'k, x', 'c, o', 'a, e', 's, z', 'l, r', 'f, t', 'n, h', and 'y, g', and they may be discriminatively input through multi-step input performed in first step input and second step input.

Further, of two letters that are grouped, one may be assigned to first directional input M and the other may be assigned to second directional input P.

Meanwhile, through one of first directional input M and second directional input P, one of numbers, symbols, various function commands, and mode switching may be performed.

Through central input C, switching between input modes or various function commands such as Enter and OK may be performed.

Here, in call mode, the central input may function as a Send/End button.

Meanwhile, the character input device 1 of the present invention may perform the function of a mouse or joystick using the input unit 10. In this case, in mouse input mode, the movement of a pointer may be performed through the first directional input M of the input unit 10 and the function of left/right buttons or the scroll function of the mouse may be performed through second directional input P.

In this case, when first directional input M is performed in the state in which second directional input P has been performed in a direction corresponding to the left button of the mouse, dragging is possible as in the case of the mouse. For signal processing related to this, signal processing used in a typical mouse may be equally used.

Further, when first directional input M is performed in multiple steps, the movement speed of a mouse pointer/game character can be adjusted in steps.

Further, in game mode, the movement of a character may be performed through first directional input M, and various types of operation commands for a character may be executed through second directional input P.

In this case, switching to the above-described mouse mode or joystick mode may be performed using a separate mode switch key 121, and may also be performed using the input unit 10. For example, the input mode may be switched by moving the input unit 10 in a circumferential direction, performing first-step or second-step central input C or by performing first directional input M in two steps.

When central input C is performed, an input mode switch window, enabling movement to other modes, is displayed, and movement to various modes may be performed through first directional input M or second directional input P.

Further, in the state in which central input C has been performed, various modes, for example, Korean input mode, English input mode, number input mode, symbol input mode, or mouse or joystick input mode may be selected through first directional input M or second directional input P. That is, while the performance of central input C is maintained, respective input modes instead of originally assigned characters are displayed in a character display unit 72 or a character plate display unit 74.

2 Sets

The number of character input devices 1 according to the present invention which are provided on the base 110 may be two or more.

Figure 19:
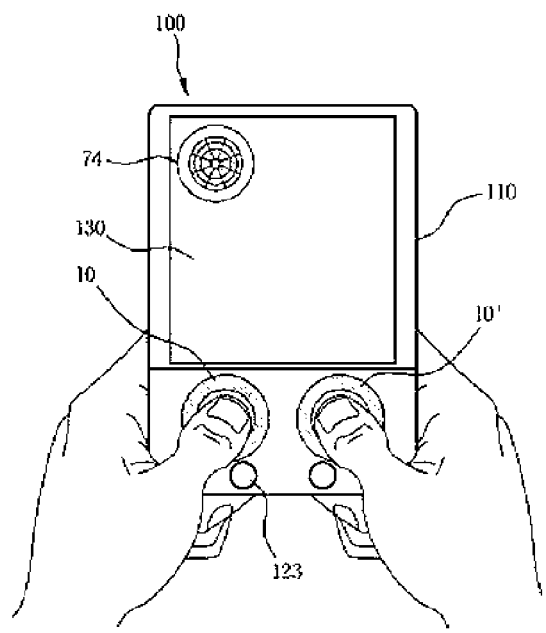
FIG. 19 is a diagram showing input being performed in a portable terminal equipped with two sets of input units provided on left and right sides according to the present invention.

FIG. 19 is a diagram showing an example of input performed when two input units 10 and 10' are provided on left and right sides of the base 110 of a portable mobile communication terminal 100.

In this case, two input units 10 and 10' may have the same or different constructions.

That is, the left input unit 10 may be provided to perform first directional input M, second directional input P and central input C, and the right input unit 10' may be provided to further perform combined central input CM and CP or combined directional input MP and PM as well as first directional input M, second directional input P, and central input C.

Further, the two input units may have different numbers of direction indication locations, and one of the input units may be provided to perform two-step input.

Figure 21:
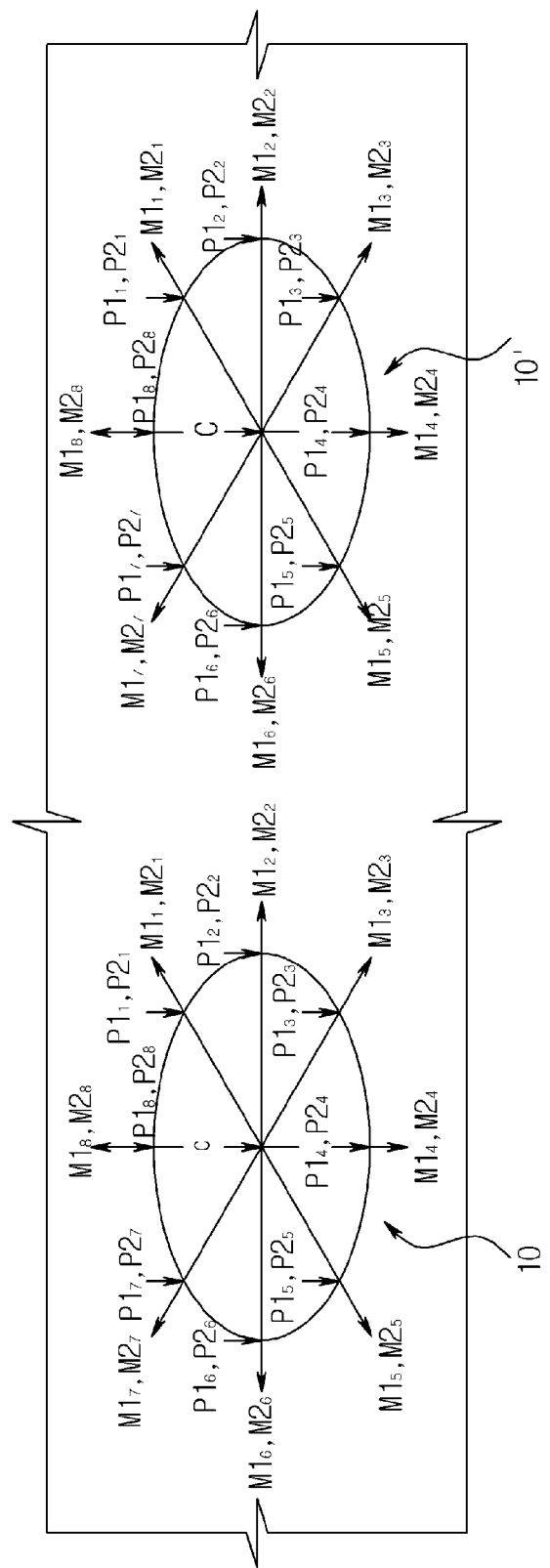
FIGS. 21 and 22 are conceptual diagrams showing examples of various combinations of respective input actions when the input unit of the present invention is provided in two sets.

FIG. 21 is a conceptual diagram showing an example of the construction of respective input units 10 and 10' when the input units 10 and 10' are provided in two sets.

Referring to the drawing, each of the input units 10 and 10' is composed of two-step first directional input M and two-step second directional input P, wherein eight first direction indication locations $M_1$, $M_2$, ..., and eight second direction indication locations $P_1$, $P_2$, ... are provided in each input unit.

Therefore, the total number of characters that can be input through the input units 10 and 10' is 64 because 16 characters are input through each of first directional input M and second directional input P except for central input C, a total of 32 characters are input using one input unit, and the two input units 10 and 10' on left and right sides are provided.

This indicates more input capacity than that required to arrange all of 24 Korean alphabet letters and 26 English alphabet letters, and thus a one-action one-phoneme input is possible. Symbols, numbers, or various types of function commands may be additionally input to the remaining direction indication locations.

Therefore, characters, numbers, symbols, etc. may be immediately input without requiring separate mode switching, thus enabling fast character input.

For example, it is possible to input characters through two-step second directional input P of the two respective input units 10 and 10', and to perform the movement of a mouse pointer/game character, function commands such as Enter, space, and Escape, mode switching and direction indication input, through first directional input M. By way of direction indication input, the movement of a cursor and menus, the control of channel/volume, etc. may be performed.

Here, it is apparent that first directional input M may be implemented only in one step, and numbers or symbols may be further arranged when the first directional input M is implemented in two steps, as shown in FIG. 21.

In contrast, it is possible to input characters through two-step first directional input M of the two respective input units 10 and 10', and to execute function commands, mode switching, direction indication input, etc. through second directional input P.

Furthermore, it is also possible to input characters using any one input unit 10 and to execute the movement of a mouse pointer/game character, function commands, mode switching, direction indication input, etc. or to input numbers or symbols using the other input unit 10'.

In this case, since the input of characters and the use of a mouse can be simultaneously performed, the effect of simultaneously using a keyboard and a mouse in a desktop computer can be obtained, so that there is an advantage in that games requiring complicated manipulation by which a keyboard and a mouse must be simultaneously used, as well as various operations, can also be executed even in small-sized terminals.

Even in the above case, it is apparent that, when at least one of first directional input M and second directional input P is implemented in two steps, numbers or symbols may be further arranged and input.

Figure 22:
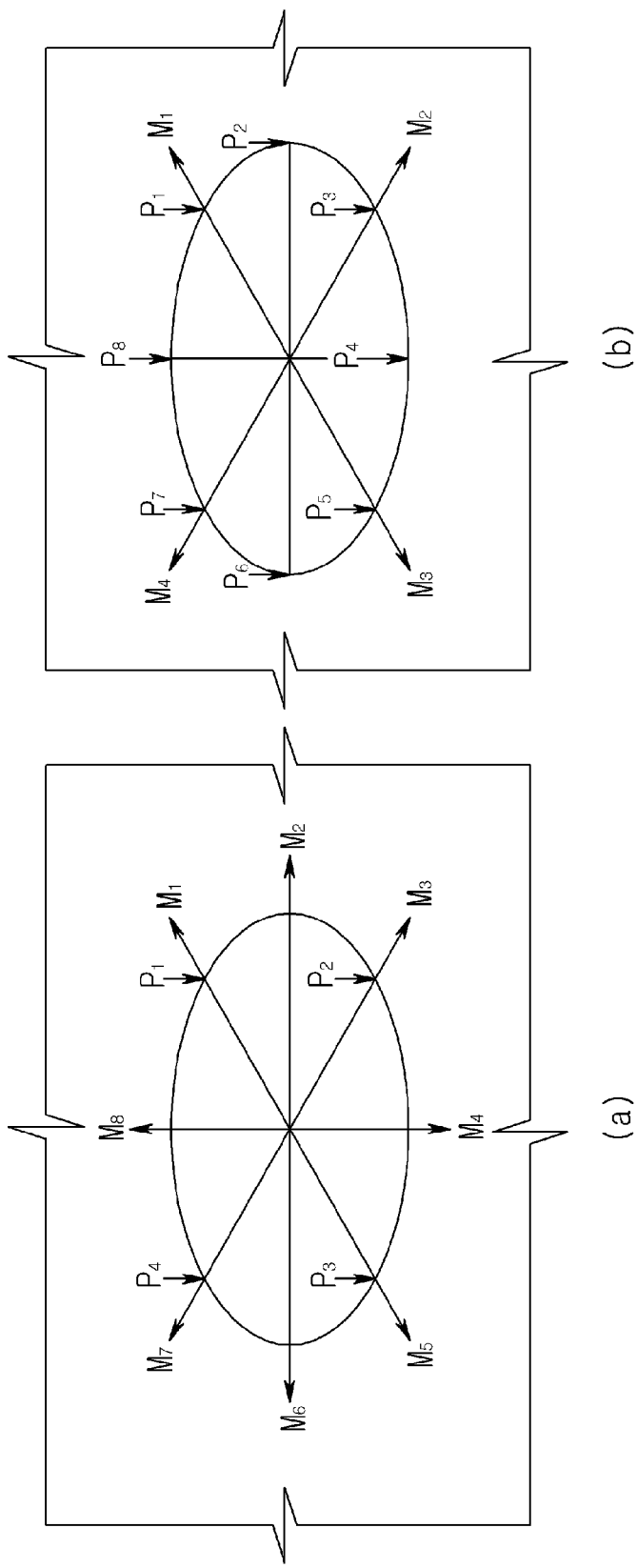

FIG. 22 is a conceptual diagram showing the construction of input units 10 and 10' according to another embodiment, which shows one of two sets of input units 10 and 10' having the same construction.

In FIG. 22(*a*), first directional input M has eight first direction indication locations $M_1$, $M_2$, ... and second directional input P has four second direction indication locations $P_1$, $P_2$, ....

In contrast, in FIG. 22(*b*), first directional input M has four first direction indication locations $M_1$, $M_2$, ... and second directional input P has eight second direction indication locations $P_1$, $P_2$, ....

Therefore, in each embodiment, the total number of characters that can be input through one input unit 10 is 12, so that a total of 24 characters can be input through the two input units 10 and 10'.

In this case, when one of first directional input M and second directional input P is implemented in two steps, the number of characters that are assigned can be further increased.

That is, in FIG. 22(*a*), when first directional input M is implemented in two steps, a total of 20 characters can be assigned to one input unit 10. When second directional input P is implemented in two steps, a total of 16 characters can be assigned.

When the input units 10 are provided on the base 110 in two sets, characters assigned to respective input units 10 and 10' and input actions may be variously arranged.

For example, vowels may be assigned to either of two input units 10 and 10', or, alternatively, may be divided and assigned to either of first directional input M and second directional input P performed by the respective input units 10 and 10'.

Meanwhile, when mode is switched to mouse mode or game mode, the movement of a pointer or a game character is performed using one of the two input units 10, and various types of operation commands for the operation of the pointer or a game character may be executed using the other input unit.

Others

The input unit 10 may have a return function of automatically returning to the reference location S after performing first directional input M or second directional input P.

The return function may be implemented using various methods, for example, in such a way that, as shown in FIG. 3, an elastic element 21 is provided between the input unit 10 and the base 110, thus enabling the input unit 10 to return to the reference location S after first directional input M.

Further, in the case of the input unit 10 of FIG. 6, the support unit 25 may be made of an elastic material. Further, in the case of second directional input P, the input unit 10 itself may be made of an elastic material.

In addition to the return function, the above elastic element 21 enables respective input steps to be discriminatively performed when first directional input M is performed in multiple steps.

Figure 23:
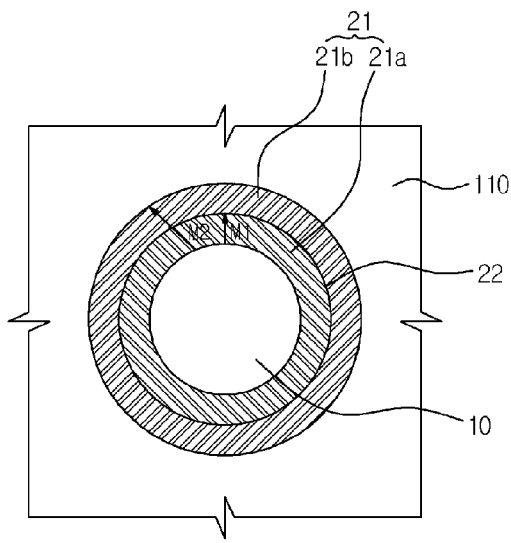
FIG. 23 is a diagram showing an input unit and an elastic element according to the present invention.

That is, as shown in FIG. 23, when first directional input M is provided in two steps, the elastic element 21 may be implemented as two elements 21*a* and 21*b* (refer to FIG. 21) having different moduli of elasticity.

Preferably, the respective elastic elements 21 are sequentially arranged such that the moduli of elasticity thereof gradually increase in a direction far way from the input unit 10 (that is, $k_{21a} < k_{21b}$), thus enabling power of resistance to be felt at the interface between first-step input and second-step input due to the difference between the moduli of elasticity.

Therefore, in order to perform second-step input according to the difference between the moduli of elasticity, a greater force than that of first-step input is required, and thus the user can discriminate first-step input from second-step input.

Meanwhile, the above-described method may be equally applied to second directional input P.

In this case, a support ring 22 may be further provided between the respective elastic elements 21*a* and 21*b*.

Meanwhile, a click means for providing an impression of clicking when one or more of first directional input M, second directional input P and central input C are performed may be further provided.

The click means may be implemented in various well-known forms. For example, projections are formed on the movement path of the input unit 10 in the case of first directional input M, thereby providing the impression of clicking when the input unit 10 passes through the click means.

The click means may be applied to all or some of the input actions. For example, when each of first directional input M, second directional input P or central input C is provided to be performed in multiple steps, the impression of clicking may be generated at the time of performing only second-stage input, thereby allowing the user to discriminate first-step input from second-step input.

Referring to FIG. 2, one or more of mode switch keys 121 required to switch input mode and function keys 123 required to input function commands, such as Enter, Escape and cursor, may be further provided on one side of the base 110.

The mode switch keys 121 or the function keys 123 may be implemented using the touch-sensing type.

Meanwhile, a display unit 130 for displaying input commands extracted by the control unit 51 may be provided on the other side of the base 110.

In this case, as shown in FIG. 19, on the display unit 130, a character plate display unit 74, on which input content based on the input action of the user or characters assigned in a selected input mode are displayed, may be provided.

Figure 20:
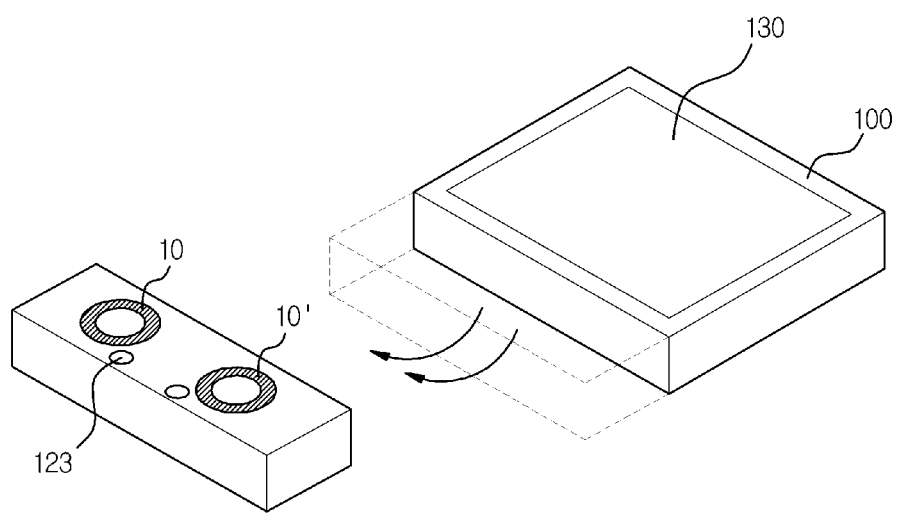
FIG. 20 is an exploded perspective view showing the state in which a character input device of the present invention is separated in the portable terminal of FIG. 19.

Here, the display unit 130 may be detachably mounted on the base 110, as shown in FIG. 20.

That is, the character input device 1 according to the present invention may be detachably mounted on a main body of an external device equipped with the display unit 130. In this case, the character input device may further include a transmission/reception unit which is connected to the external device using one or more of a wired method and a wireless method and is configured to transmit data extracted by the control unit 51 to the external device or receive data from the external device.

Thanks to this structure, the character input device 1 of the present invention may be used as a remote control for remotely controlling a computer or a television. In this case, channel switching or volume control may be performed using one of first directional input M and second directional input P.

Furthermore, the input of numbers or the switching of various modes may be performed through first directional input M and channel switching or volume control may be performed through second directional input P.

Meanwhile, as shown in FIG. 16, in either one of the base 110 and the input unit 10, first character display units 72a on which first characters assigned to respective first direction indication locations $M_1, M_2, \ldots$ are displayed to correspond to the first direction indication locations $M_1, M_2, \ldots$, and second character display units 72b on which second characters assigned to respective second direction indication locations $P_1, P_2, \ldots$ are displayed to correspond to the second direction indication locations $P_1, P_2, \ldots$ may be further provided.

The first and second character display units 72a and 72b may be configured such that input characters are changed and displayed according to the input mode when two or more characters are assigned together to each location.

For example, the first or second character display units 72a or 72b are implemented as LCD panels, thus enabling only Korean alphabet letters to be displayed at the time of inputting the Korean alphabet and only English alphabet letters to be displayed at the time of inputting the English alphabet.

Meanwhile, as shown in FIG. 2, a reference location detection unit 68 disposed at the reference location S and configured to detect that the input unit 10 is located at the reference location S may be further included.

The reference location detection unit 68 is configured to detect that the input unit 10 is placed at the reference location S, and a detection signal output therefrom may be used as a reset signal required to input characters or the like.

Figure 24:
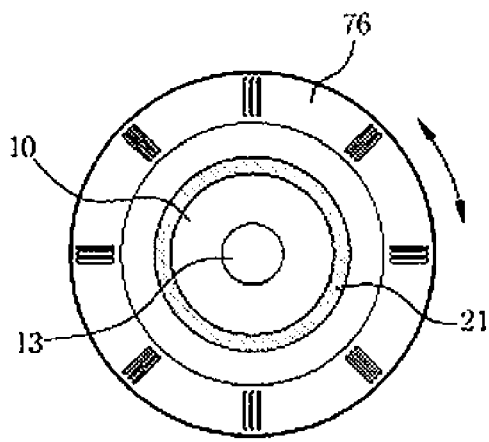
FIG. 24 is a plan view showing a structure in which a rotating wheel is provided around an input unit according to the present invention.

Referring to FIG. 24, a rotating wheel 76 provided adjacent to the input radius 111 of the base 110 and configured to perform a scroll function, volume control function or search function according to the input mode of the input unit 10 may be further provided.

Further, instead of the rotating wheel 76, a circular band-shaped detection means for performing a scroll function or a plurality of detection means arranged in a circular shape around the input unit 10 may be provided.

Figure 25:
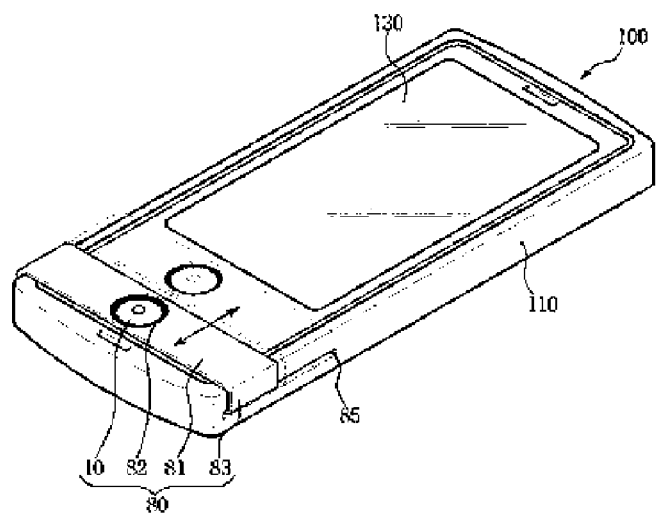
FIG. 25 is a diagram showing the operational relationship between a character input device according to the present invention and a connection element.

Meanwhile, as shown in FIG. 25, a connection element 80 for enabling the entire input unit 10 to be movable with respect to the base 110 is provided, thus allowing the user to freely change an input location.

The connection element 80 may be configured in various forms, and may include, for example, a band-shaped main body 81, a receiving part 82 formed in the main body 81 and configured to receive the input unit 10 so that first directional input M and second directional input P can be performed, and movable support units 85 provided at both ends of the main body 81 and configured to slide along slide grooves 85 formed in the base 110 with the movable support units 85 coupled to the slide grooves 85.

Figure 51:
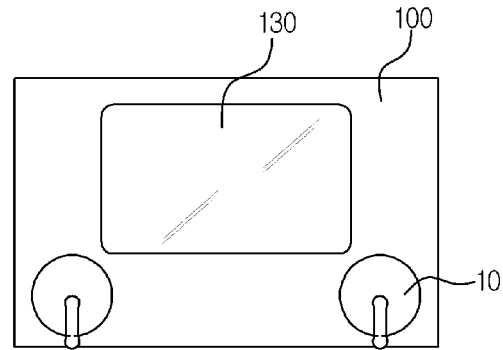
FIG. 51 is a view showing the state of use in various embodiments of the present invention.
Figure 51:
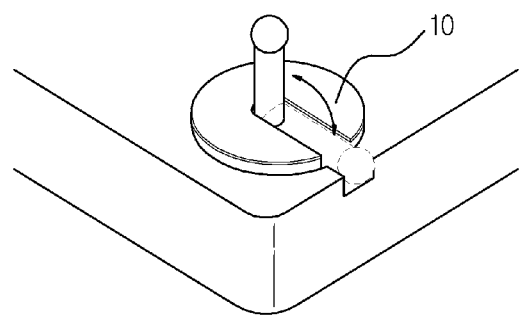

Further, as shown in FIG. 51, the input unit 10 of the present invention may be configured such that an operation rod is included in the top of the input unit. On the top of the input unit, a slit into which the operation rod is inserted when being horizontally laid is formed. In a non-use state, the operation rod is mounted in the slit formed on the top of the input unit with the operation rod horizontally laid in the slit. In a use state, first directional input, second directional input and central input can be performed while the user makes the operation rod stand vertically and holds the operation rod using the thumb and the index finger. When the operation rod is not used, it is laid down again and inserted into the slit formed on the top of the input unit. It is apparent that the input unit 10 can be manipulated with the finger put on an input key part, similarly to the above-described embodiments.

Further, the operation rod may be used in such a way that it is extended from (or drawn from) and extracted to the base 110.

Figure 52:
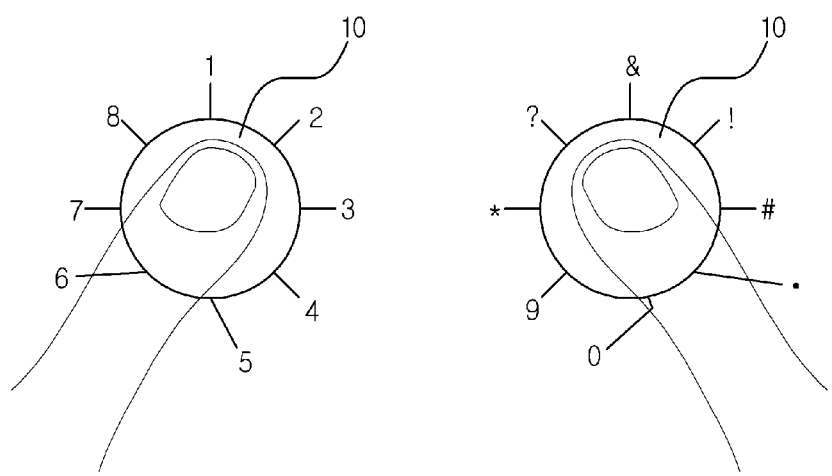
FIG. 52 is a diagram showing input terminals according to various embodiments of the present invention.

As shown in FIG. 52, the present invention is configured such that a character plate enabling characters to be input may be displayed on the base 110 around the input keys. At this time, the character plate is displayed to the left or right of the input unit 10 so that keys placed under a finger manipulating the input unit 10 are not hidden by the finger.

The character plate may be preferably implemented as an LCD so that the content of keys is changed to characters, symbols or numbers according to the mode.

Meanwhile, the character input device of the present invention is capable of inputting data through the movement and pressing of the input unit 10 and the pressing and movement of the input unit. Through movement and pressing, consonants may be input, and through pressing and movement, vowels may be input.

In more detail, when input can be performed in four radial directions using the input unit, four characters are radially assigned to second direction indication locations if first directional input M is performed by moving the input unit to a specific first direction indication location. At this time, second directional input P is performed by pressing the input unit in a direction in which a specific character is located, thus enabling the character to be input.

Further, when second directional input P is performed by pressing a second direction indication location, four characters are radially assigned to first direction indication locations. At this time, first directional input M is performed by moving the input unit in a direction in which a specific character is arranged, thus enabling the character to be input.

According to the above-described input method, 16 characters can be arranged through movement and pressing, and 16 characters can be arranged through pressing and movement, so that a total of 32 characters can be arranged. In this case, the input unit 10 not only can be configured in two sets to enable more characters to be input, but also can be configured to input characters in eight directions.

At this time, it is possible to input consonants through a movement and pressing method, and input vowels through a pressing and movement method.

Figure 53:
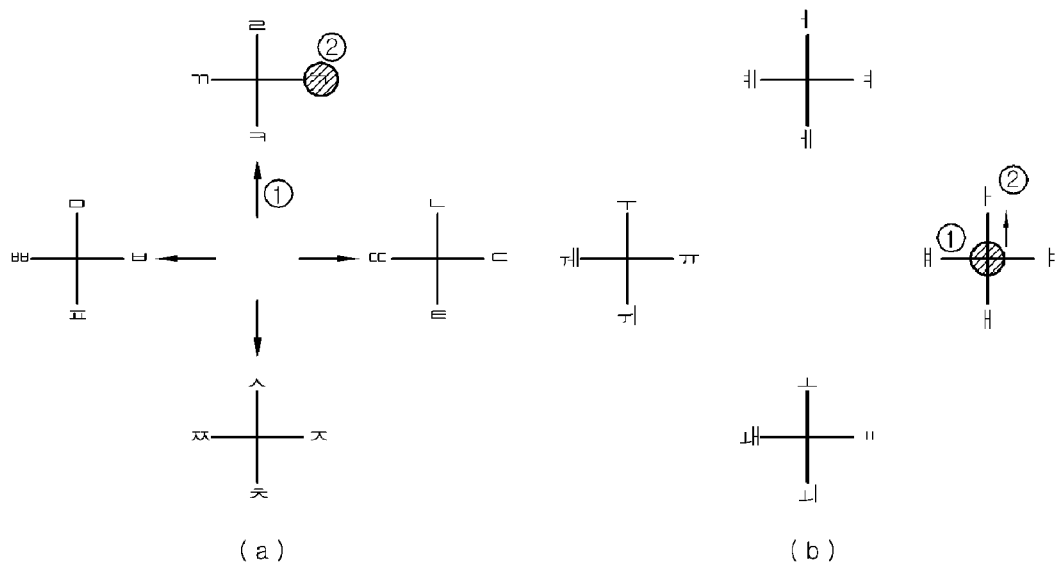
FIG. 53 is a diagram showing input methods according to other embodiments of the present invention.

An example of this input form is described with reference to FIG. 53.

For example, in order to input a consonant 'ㄱ', it must be input through a movement and pressing method. That is, as shown in FIG. 53(a), after first directional input has been performed by moving the input unit in the direction of 12 o'clock (①), or in the state in which the first directional input has been performed, when second directional input is performed by pressing the input unit in the direction of 3 o'clock (②), the letter 'ㄱ' is input.

Further, in order to input a vowel 'ㅏ', it must be input through a pressing and movement method. That is, as shown in FIG. 53(b), in order to input 'ㅏ', after second directional input is performed by pressing the input unit in the direction of 3 o'clock (①) or in the state in which the second directional input has been performed, when first directional input is performed by moving the input unit in the direction of 12 o'clock (②), the vowel 'ㅏ' is input.

Meanwhile, in the case where only a central touch detection unit detects input when touch detection units are present in all of a central input part and a second directional input part, where all of the touch detection units of the second directional input part do not detect input and first directional input or second directional input is performed when a plurality of touch detection units is present in only the second directional input part, and where first directional input or second directional input is performed in the state in which all of the touch detection units placed at the central or second directional input part detect input may be discriminated from each other, and thus different types of data may be input.

For example, when the finger is put on the entire input unit to perform input, first directional input or second directional input is used as character input. When the tip of the finger is put on the center of the input unit to perform input, the first or second directional input may be used as a mouse.

Those skilled in the art will appreciate that the above described present invention is not limited to the preferred embodiments and attached drawings and various modifications, additions and substitutions are possible, without departing from the scope and spirit of the invention.

The invention claimed is:

1. A character input device, comprising: a base; an input unit provided on the base and configured to include a movable input unit for performing first directional input in such a way that the movable input unit is moved from a reference location to any one of a plurality of first direction indication locations arranged radially around the reference location and spaced apart from one another, and a press input unit for performing second directional input in such a way that any one of a plurality of second direction indication locations arranged radially on the press input unit itself and spaced apart from one another is pressed;
   a first detection unit for detecting movement of the movable input unit;
   a second detection unit for detecting pressing of the press input unit; and
   a control unit for extracting a first character assigned to a first direction indication location at which the movement of the movable input unit is detected, or a second character assigned to a second direction indication location at which pressing of the press input unit is detected, from a memory unit and executing the first or second character.

2. The character input device according to claim 1, wherein the movable input unit performs the first directional input by performing lateral movement.

3. The character input device according to claim 1, wherein the movable input unit performs the first directional input by performing tilting movement.

4. The character input device according to claim 1, wherein the press input unit is operated in association with the movable input unit, and thus is moved together with the movable input unit when the movable input unit performs first directional input.

5. The character input device according to claim 1, further comprising a direction press input unit arranged below the press input unit and at a location at which the direction press input unit is capable of coming into contact with the press input unit through second directional input performed using the press input unit even if the movable input unit performs the first directional input, the direction press input unit coming into contact with the second detection unit by contact of the press input unit.

6. The character input device according to claim 1, further comprising a direction press input unit configured to support a bottom of the movable input unit and arranged at a location at which the direction press input unit is capable of coming into contact with the press input unit through second directional input performed using the press input unit even if the movable input unit performs the first directional input, the direction press input unit coming into contact with the second detection unit by contact of the press input unit.

7. The character input device according to claim 1, wherein the movable input unit is formed in a shape of a stick, and the first detection unit is provided to correspond to a bottom of the movable input unit and configured to detect movement of the movable input unit.

8. The character input device according to claim 1, wherein the movable input unit is provided to be stacked on the press input unit.

9. The character input device according to claim 8, wherein the press input unit is maintained at an original position thereof when first directional input is performed using the movable input unit.

10. The character input device according to claim 9, wherein the first detection unit is installed on a sidewall of the base and configured to detect the first directional input of the movable input unit.

11. The character input device according to claim 9, wherein the press input unit is formed to have a through center, and the first detection unit is installed at a location of the base corresponding to the through center of the press input unit, thus detecting the first directional input of the movable input unit.

12. A character input device, comprising:

a base;

a movable input unit provided at a reference location of the base and configured to perform first directional input in which the movable input unit is moved to any one of a plurality of first direction indication locations arranged radially around the reference location and spaced apart from one another;

press input units respectively provided on the base at a plurality of second direction indication locations arranged radially around the reference location and spaced apart from one another, and configured to perform second directional input in which any one of the second direction indication locations is pressed;

a first detection unit for detecting movement of the movable input unit;

a second detection unit for detecting pressing of the press input units; and a control unit for extracting a first character assigned to a first direction indication location at which the movement of the movable input unit is detected, or a second character assigned to a second direction indication location at which pressing of a relevant press input unit is detected, from a memory unit, and executing the first or second character, wherein a film-shaped associative input unit for enabling first directional input to be performed by moving the movable input unit along with the press input units by movement or tilting of the press input units is provided over the movable input unit and the press input units.

13. A character input device, comprising:

a support unit;

a detection unit installed on the support unit;

a tilt portion for performing second directional input in such a way that the tilt portion is tilted from a reference location to any one of a plurality of first direction indication locations arranged radially around the reference location and spaced apart from one another;

a press unit for performing first directional input in such a way that any one of a plurality of second direction indication locations arranged radially on the press unit itself and spaced apart from one another is pressed, and is formed on the top of the tilt portion; and a control unit for extracting a first character assigned to the first direction indication location or a second character assigned to the second direction indication location, from a memory unit, and executing the first or second character.

14. The character input device according to claim 13, further comprising an elastic element installed between the support unit and the tilt portion.

15. The character input device according to claim 14, further comprising a contact projection corresponding to the detection unit, provided on the inner side of the tilt portion.

16. The character input device according to claim 15, wherein both the contact projection and the detection unit are provided to respectively correspond to the second direction indication locations.

* * * * *